US012744169B2

(12) United States Patent
Pan et al.

(10) Patent No.: US 12,744,169 B2
(45) Date of Patent: Sep. 22, 2026

(54) BACKLIGHT MODULE AND LIGHTING KEYBOARD

(71) Applicant: Darfon Electronics Corp., Taoyuan City (TW)

(72) Inventors: Yi-Jui Pan, Taoyuan City (TW); Hsin-Cheng Ho, Taoyuan City (TW)

(73) Assignee: Darfon Electronics Corp., Taoyuan City (TW)

(*) Notice: Subject to any disclaimer, the term of this patent is extended or adjusted under 35 U.S.C. 154(b) by 0 days.

(21) Appl. No.: 19/316,037

(22) Filed: Sep. 2, 2025

(65) Prior Publication Data

US 2026/0018350 A1 Jan. 15, 2026

Related U.S. Application Data

(63) Continuation-in-part of application No. 18/780,572, filed on Jul. 23, 2024, now Pat. No. 12,518,936, (Continued)

(30) Foreign Application Priority Data

Nov. 22, 2023 (TW) ................................ 112145095
Jan. 23, 2025 (TW) ................................ 114103148

(51) Int. Cl.
*H01H 13/00* (2006.01)
*F21V 8/00* (2006.01)
(Continued)

(52) U.S. Cl.
CPC ......... *H01H 13/023* (2013.01); *G02B 6/0035* (2013.01); *G02B 6/0085* (2013.01);
(Continued)

(58) Field of Classification Search
CPC .. H01H 13/023; G06F 3/0202; G02B 6/0035; G02B 6/0085
See application file for complete search history.

(56) References Cited

U.S. PATENT DOCUMENTS 10,948,651 B1 * 3/2021 Ho ........................ H01H 13/83
11,994,707 B2 * 5/2024 Chen ...................... G02B 6/005
(Continued)

FOREIGN PATENT DOCUMENTS

CN 105114868 A * 12/2015 .......... G02B 6/0038

*Primary Examiner* — Gerald J Sufleta, II

(57) ABSTRACT

A backlight module for a lighting keyboard having a specific function key comprises a lighting board, a light guide panel and a shielding sheet. The shielding sheet, the light guide panel and the lighting board are stacked from top to bottom. The lighting board has first and second light emitting units. The light guide panel has first and second light guide holes. The first light emitting unit is in the first light guide hole. The second light emitting unit is in the second light guide hole. The shielding sheet has a blocking portion. The blocking portion overlaps in projection with the first light emitting unit and the second light emitting unit. The light guide panel has a light guide panel slot. The light guide panel slot overlaps in projection with the blocking portion and a boundary of a keycap projection area of the specific function key.

19 Claims, 22 Drawing Sheets

Related U.S. Application Data which is a continuation of application No. 18/398,285, filed on Dec. 28, 2023, now Pat. No. 12,154,729.

(60) Provisional application No. 63/444,573, filed on Feb. 10, 2023, provisional application No. 63/695,911, filed on Sep. 18, 2024, provisional application No. 63/755,297, filed on Feb. 7, 2025.

(51) Int. Cl.
*G06F 3/02* (2006.01)
*H01H 13/02* (2006.01)

(52) U.S. Cl.
CPC ..... *G06F 3/0202* (2013.01); *H01H 2219/056* (2013.01); *H01H 2219/06* (2013.01); *H01H 2219/062* (2013.01)

(56) References Cited

U.S. PATENT DOCUMENTS

2017/0004935 A1* 1/2017 Wang ................... H01H 13/023
2018/0149797 A1* 5/2018 Chen ..................... G06F 3/0202

* cited by examiner

BACKLIGHT MODULE AND LIGHTING KEYBOARD

This application claims the benefit of U.S. Provisional Application No. 63/695,911, filed on Sep. 18, 2024, the benefit of Taiwan application Serial No. 114103148, filed on Jan. 23, 2025, and the benefit of U.S. Provisional Application No. 63/755,297, filed on Feb. 7, 2025. This application is a continuation-in-part (CIP) application of application Ser. No. 18/780,572, filed Jul. 23, 2024, which is a continuation application of U.S. application Ser. No. 18/398,285, filed Dec. 28, 2023 (now patented as U.S. Pat. No. 12,154,729, issued Nov. 26, 2024), which claims the benefit of U.S. Provisional Application No. 63/444,573, filed on Feb. 10, 2023 and the benefit of Taiwan application Serial No. 112145095, filed on Nov. 22, 2023. The contents of these applications are incorporated herein by reference.

FIELD OF THE INVENTION

The invention relates to a lighting keyboard and a backlight module for the same.

DESCRIPTION OF THE PRIOR ART

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. When a conventional luminous keyboard is used in a thin computing device, a large number of components are stacked in a small space of the computing device, thereby raising a prominent heat dissipation problem. Further, with advancements in technology, computing devices are also equipped with specific functions such as artificial intelligence (AI)-assisted features. Thus, there is a need to improve heat dissipation efficiency of the computing devices and be responsive to the specific function, and keyboard modules embedded them need to be correspondingly adjusted as well.

SUMMARY OF THE INVENTION

The invention is directed to provide a backlight module and a lighting keyboard, to solve the aforementioned problems.

According to an aspect of the invention, a backlight module for a lighting keyboard is provided. The backlight module comprises a lighting board, a light guide panel and a shielding sheet. The lighting keyboard has a specific function key. The shielding sheet, the light guide panel and the lighting board are stacked from top to bottom. The lighting board has a first light emitting unit and a second light emitting unit. The light guide panel has a first light guide hole and a second light guide hole. The first light emitting unit is in the first light guide hole, and the second light emitting unit is in the second light guide hole. The shielding sheet has a blocking portion. The blocking portion overlaps in projection with the first light emitting unit and the second light emitting unit. The light guide panel has a light guide panel slot, and the light guide panel slot overlaps in projection with the blocking portion and a boundary of a keycap projection area of the specific function key.

According to another aspect of the invention, a lighting keyboard is provided. The lighting keyboard comprises a backlight module and a specific function key. The backlight module includes a lighting board, a light guide panel and a shielding sheet. The lighting board has a first light emitting unit. The light guide panel has a first light guide hole. The first light emitting unit is in the first light guide hole. The shielding sheet has a blocking portion. The shielding sheet, the light guide panel and the lighting board are stacked from top to bottom. The blocking portion overlaps in projection with the first light emitting unit. The specific function key is located above the backlight module and includes a key circuit board. The key circuit board has a second light emitting unit. The light guide panel has a light guide panel slot. The light guide panel slot overlaps in projection with the blocking portion and a boundary of a keycap projection area of the specific function key.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
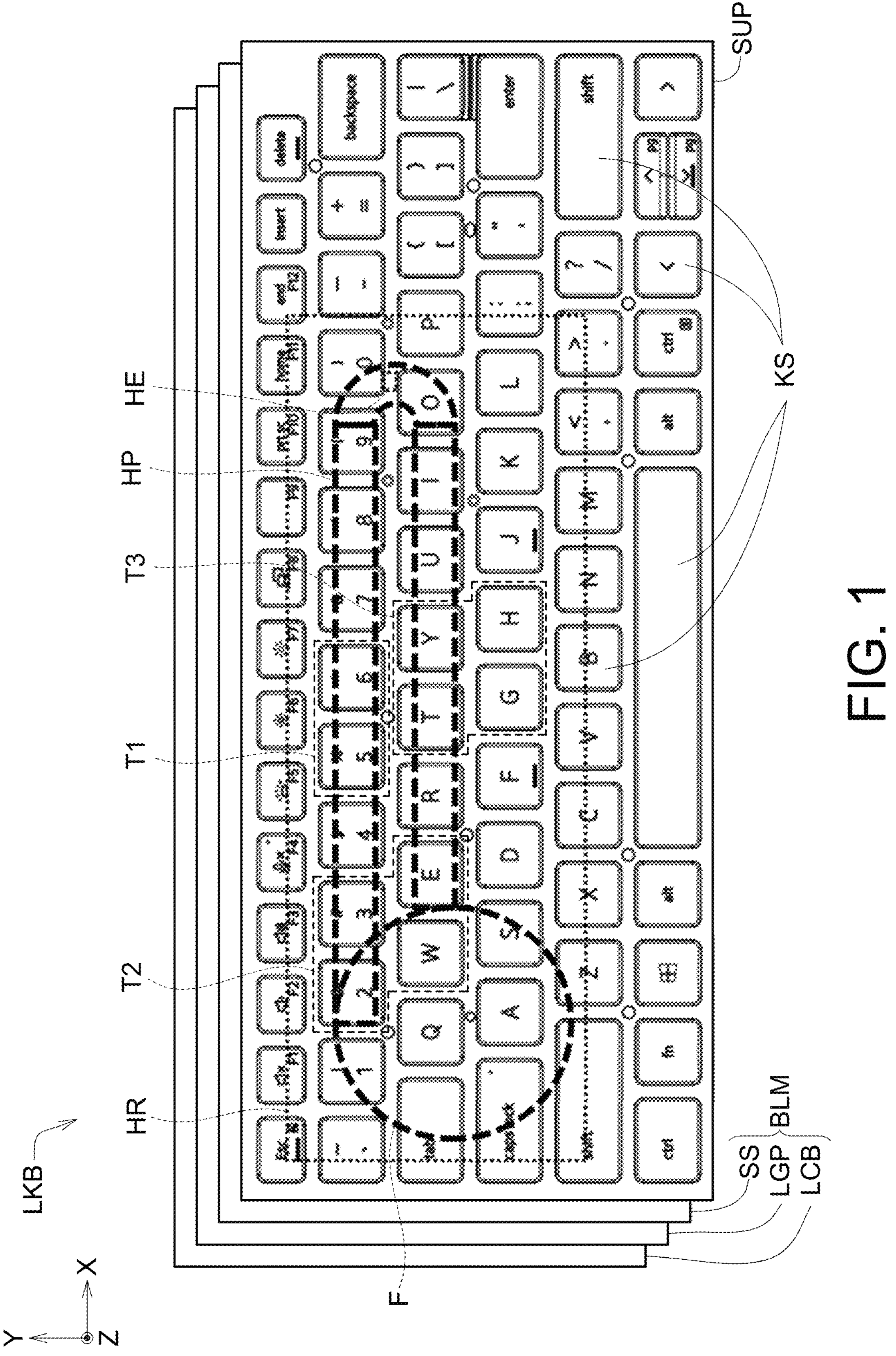
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

Figure 2:
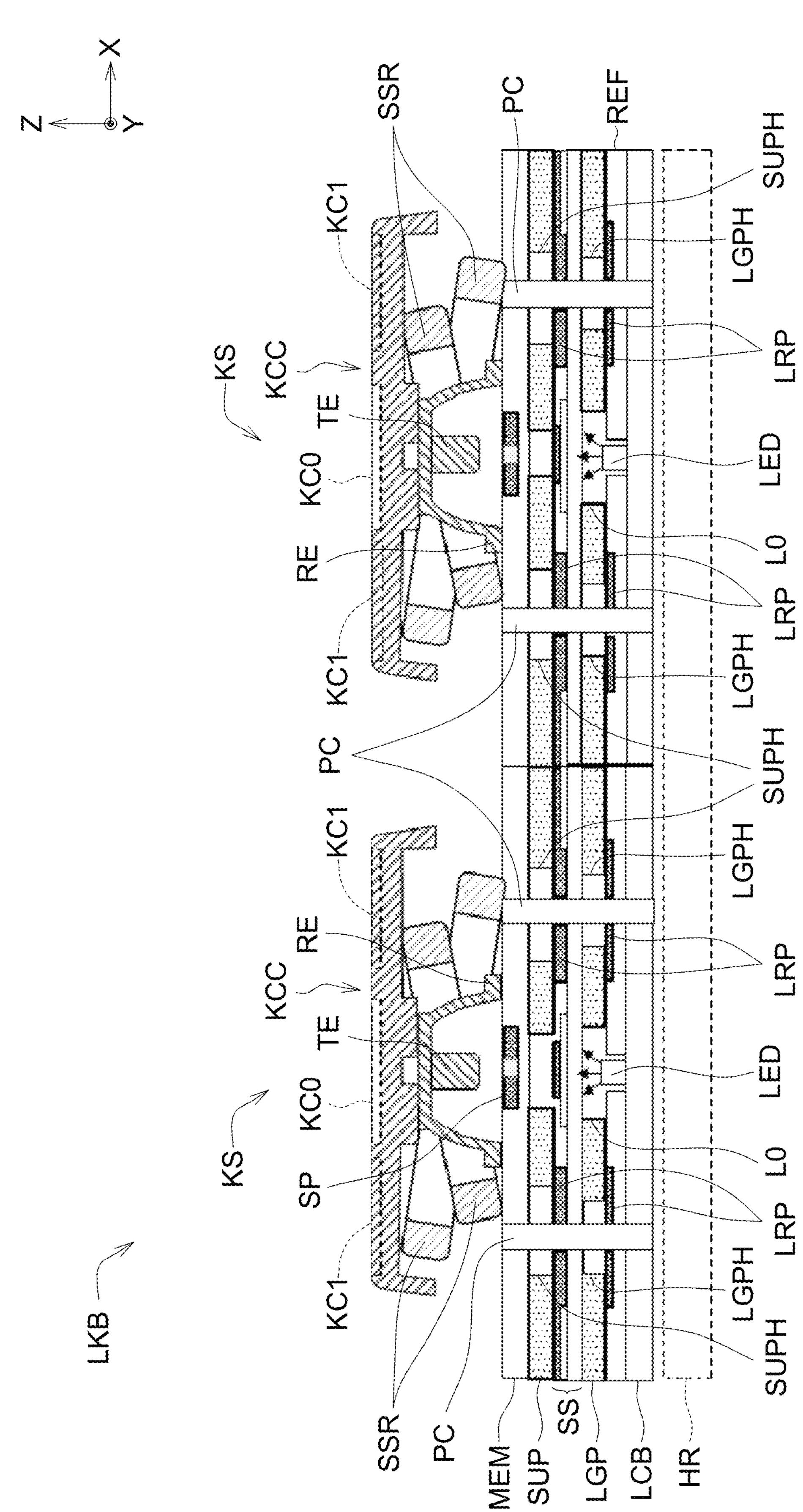
FIG. 2 is a partial sectional view illustrating the lighting keyboard shown in FIG. 1.
Figure 3:
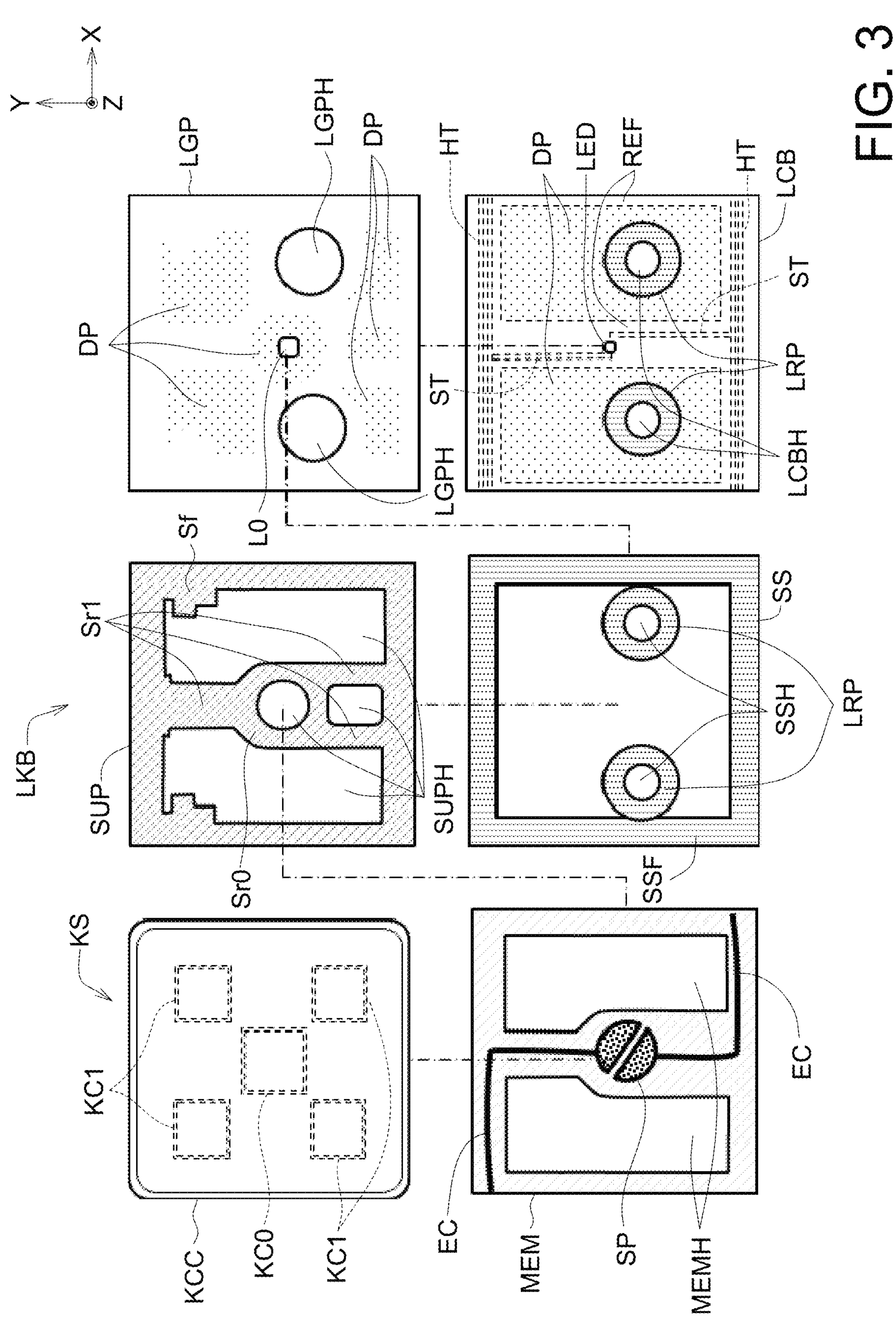
FIG. 3 is a partial exploded view illustrating the lighting keyboard shown in FIG. 1.

As shown in FIG. 1, there are a heating element HE (e.g. integrated circuit or electronic element), a fan F and a heat pipe HP below the lighting keyboard LKB. Heat dissipation are needed at a heat region HR where the heating element HE, the fan F and the heat pipe HP overlap with the lighting keyboard LKB. The lighting keyboard LKB comprises a backlight module BLM and a plurality of heat-dissipating keys KS. A support plate SUP is disposed on the backlight module BLM and the heat-dissipating keys KS are disposed on the support plate SUP. In general, the heat-dissipating keys KS may comprise square keys and multiple keys (e.g. space key). It should be noted that the number, size and arrangement of the heat-dissipating keys KS may be determined according to practical applications, so the invention is not limited to the embodiment shown in the figure. The backlight module BLM comprises a lighting board LCB, a light guide panel LGP and a shielding sheet SS. The light guide panel LGP is configured in optical communication with at least one light emitting unit LED on the lighting board LCB, as shown in FIG. 2 and FIG. 3. The lighting board LCB, the light guide panel LGP and the shielding sheet SS are stacked up and down (or may be referred to as stacked vertically), namely the light guide panel LGP is disposed on the lighting board LCB and the shielding sheet SS is disposed on the light guide panel LGP.

Further referring to FIGS. 2 to 3, FIG. 2 is a partial sectional view illustrating the lighting keyboard LKB shown in FIG. 1, FIG. 3 is a exploded view illustrating layers of a single heat-dissipating key KS of the lighting keyboard LKB shown in FIG. 1, wherein a support mechanism SSR, a trigger element TE and a restoration member RE are omitted in FIG. 3.

In this embodiment, each heat-dissipating key KS on the lighting keyboard LKB corresponds to at least one light emitting unit (e.g. LED) on the lighting board LCB of the backlight module BLM. In other possible embodiments, each heat-dissipating key KS on the lighting keyboard LKB corresponds to a light bar on the lighting board LCB of the backlight module BLM. The backlight module BLM may have a plurality of penetration channels PC symmetrically to correspond to the heat-dissipating keys KS respectively, so as to allow hot air and cold air to flow and exchange through penetration channels PC. The penetration channels PC penetrate the lighting board LCB, the light guide panel LGP and the shielding sheet SS. When the lighting board LCB is a small-sized light bar, the penetration channels PC may not be able to penetrate the lighting board LCB. In such case, the penetration channels PC penetrate the shielding sheet SS, the light guide panel LGP and a reflective layer REF on top of the light bar functioning as the lighting board LCB. As shown in FIG. 2, two penetration channels PC are provided below a single heat-dissipating key KS, but the invention is not so limited. The penetration channels PC also penetrate the key circuit board MEM, the support plate SUP and a reflective layer REF. That is to say, the penetration channel PC is formed by stacking the perforations of layers of the key circuit board MEM, the support plate SUP, the shielding sheet SS, the light guide panel LGP, the reflective layer REF and the lighting board LCB in the Z direction, wherein these perforations at least partially overlaps one another. The perforation of the light guide panel LGP can be larger than the perforations of the reflective layer REF and the shielding sheet SS. The penetration channels PC are configured to be heat-dissipating channels for the heat region HR.

The heat-dissipating key KS comprises a keycap KCC, the support mechanism SSR, the key circuit board MEM and the support plate SUP. The keycap $K_{CC}$ is disposed with respect to the support plate SUP. The keycap $K_{CC}$ has an inner outlet KC0, such that the light emitted by a light emitting unit LED may be projected from the inner outlet KC0 to illuminate the character on the keycap KCC. The keycap $K_{CC}$ further has a plurality of outer outlets KC1 being adjacent to the inner outlet KC0. As shown in FIG. 2, the positions of the outer outlets KC1 correspond to the positions of the penetration channels PC, such that the penetration channels PC can be disposed below an opaque area, thereby reducing the upward light leakage. The support mechanism SSR is disposed between the keycap $K_{CC}$ and the support plate SUP. When the keycap $K_{CC}$ is pressed, the keycap $K_{CC}$ will move vertically toward the support plate SUP along with the support mechanism SSR. Furthermore, the restoration member RE may be further disposed between the keycap $K_{CC}$ and the support plate SUP, wherein the restoration member RE may be, but is not limited to, a rubber dome. The keycap KCC, the support mechanism SSR, the restoration member RE, the key circuit board MEM and the support plate SUP may be mainly formed by a non-reflective or low-reflective material or a light-absorbing material, thereby reducing the downward light reflection.

The key circuit board MEM is disposed above the backlight module BLM. Furthermore, a switch pad SP corresponding to the trigger element TE of the heat-dissipating key KS may be provided on the key circuit board MEM, wherein the switch pad SP may be, but is not limited to, a membrane switch. In this embodiment, the key circuit board MEM comprises an electric circuit portion EC, a plurality of membrane holes MEMH and the switch pad SP. The membrane hole MEMH constitutes a part of the penetration channel PC. The switch pad SP is connected to the electric circuit portion EC and is located between the membrane holes MEMH. Furthermore, the key circuit board MEM can be coated with a light-absorbing material around the penetration channel PC, thereby reducing the upward light leakage.

Each of the heat-dissipating keys KS comprises a part of the support plate SUP. In this embodiment, the support plate SUP may include a surrounding rib Sr0, a plurality of bridge ribs Sr1 and a support frame Sf, wherein the bridge ribs Sr1 connect the surrounding rib Sr0 and the support frame Sf, and there are a plurality of support plate holes SUPH between the bridge ribs Sr1, the surrounding rib Sr0 and the support frame Sf. The support plate holes SUPH on two sides are a part of the penetration channel PC. The switch pad SP of the key circuit board MEM is disposed with respect to a support plate hole SUPH in the center of the support plate SUP, such that the switch pad SP may partially enter the support plate hole SUPH in the center of the support plate SUP without interfering with the shielding sheet SS and the light emitting unit LED below the shielding sheet SS.

The shielding sheet SS is disposed below the support plate SUP. IN this embodiment, the shielding sheet SS has a plurality of shielding sheet holes SSH, a plurality of light-reducing patterns LRP and a shielding frame SSF, with the rest of the shielding sheet SS remaining a rectangular light permeable area surrounded by the shielding frame SSF. The rectangular light permeable area has four corners corresponding to the four corners of shielding frame SSF and to the four corners of the keycap KCC. The light permeable area allow light to pass through upwards and illuminate the keycap KCC. The shielding sheet holes SSH are respectively located in the light-reducing patterns LRP, and the shielding frame SSF corresponds to the support frame Sf of the support plate SUP. The shielding sheet hole SSH constitutes a part of the penetration channel PC. The light-reducing pattern LRP of the shielding sheet SS is provided at periphery of each penetration channel PC for blocking light. The light-reducing pattern LRP can be a ring-shaped black ink being coated on the top surface and/or the bottom surface of the shielding sheet SS.

The light guide panel LGP is disposed below the shielding sheet SS. In this embodiment, the light guide panel LGP has a light guide hole L0, a plurality of light guide panel holes LGPH and a plurality of diffusion patterns DP. The light emitting unit LED is located in the light guide hole L0. The top surface and/or the bottom surface of the light guide panel LGP close to the light guide hole L0 may have adhesive around the light guide hole L0 to adhere the shielding sheet SS and/or the lighting board LCB respectively. The position of the light guide panel hole LGPH corresponds to the position of the shielding sheet holes SSH and constitutes a part of the penetration channel PC. The diffusion patterns DP may be formed by microstructure regions, and the positions thereof correspond to the positions of the support plate holes SUPH, and the light permeable area of shielding sheet SS so as to guide the light transmitted in the light guide panel LGP to emit out upward. From top view in the Z direction, the diffusion patterns DP of the light guide panel LGP can be provided near the light-reducing pattern LRP of the shielding sheet SS to guide the light of the light emitting unit LED to illuminate the corresponding heat-dissipating key KS. The diffusion patterns DP of the light guide panel LGP each is configured at a position corresponding to the four corners of shielding frame SSF, the four corners of the light permeable area of shielding sheet SS, and corresponding to the four corners of the keycap KCC, thereby facilitating the light uniformity along the peripheral of keycap KCC, including four edges and four corners. Furthermore, either realizing the light-reducing pattern LRP by a ring-shaped black ink coated on the top surface or the bottom surface of the light guide panel LGP at periphery of the penetration channel PC, or coating a light-absorbing material on the hole wall of the light guide panel hole LGPH, or providing adhesive on the top surface and the bottom surface of the light guide panel hole LGPH near periphery of the penetration channel PC can all reduce the upward or downward light leaking from the light guide panel LGP in the penetration channel PC.

The lighting board LCB is disposed below the light guide panel LGP and may include the reflective layer REF on top of the lighting board LCB. In this embodiment, the lighting board LCB comprises the light emitting unit LED, a plurality of lighting board holes LCBH, a plurality of light-reducing patterns LRP, a plurality of diffusion patterns DP, a plurality of main traces HT and a plurality of sub-traces ST. The light-reducing patterns LRP may be realized on the top surface of lighting board LCB, or on the top surface of reflective layer REF, especially when lighting board LCB is a small-sized light bar. The light emitting unit LED is connected between two sub-traces ST, and the light emitting unit LED is connected between two main traces HT through the two sub-traces ST. In this embodiment, the main traces HT and the sub-traces ST constitute the lighting circuit of the light emitting unit LED, the main trace HT may be a main drive trace, and the sub-trace ST may be a sub-drive trace. The light emitting unit LED may be a white LED or a combination of RGB LEDs according to practical applications. In general, the main trace HT has a larger cross-sectional area and may cross a plurality of heat-dissipating keys KS. The position of the lighting board hole LCBH corresponds to the positions of the light guide panel hole LGPH and the shielding sheet holes SSH, and constitutes a part of the penetration channel PC. The light-reducing pattern LRP can be a ring-shaped black ink being formed in the reflective layer REF to be disposed at periphery of the penetration channel PC. The diffusion patterns DP may also be formed by the microstructure regions and can be formed in the reflective layer REF, and the diffusion patterns DP are disposed near the light-reducing pattern LRP, so as to guide the light of the light emitting unit LED to illuminate the corresponding heat-dissipating key KS. The diffusion patterns may be formed on the light guide panel LGP and/or the lighting board LCB.

Figure 4:
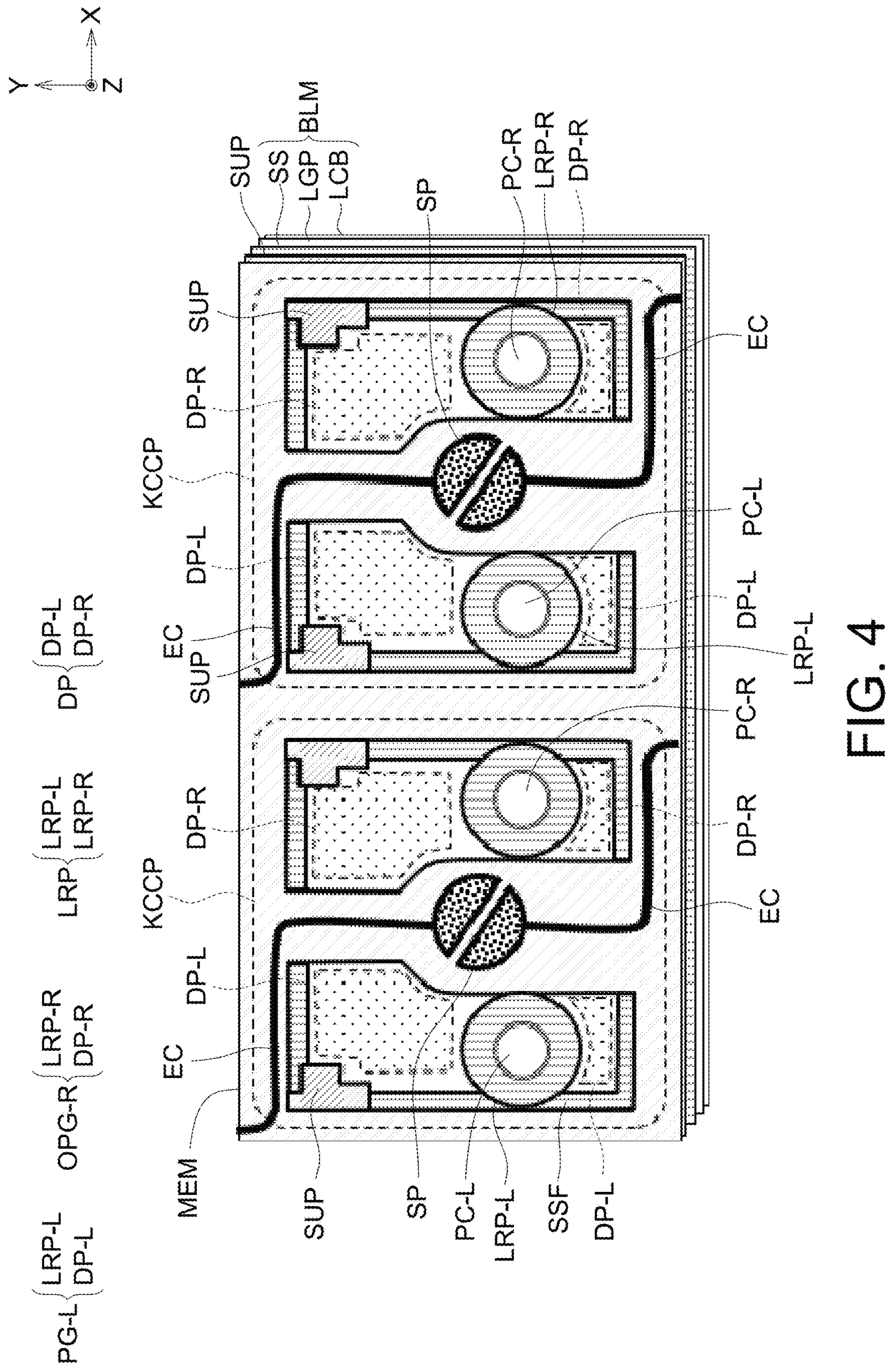
FIG. 4 is a partial top view illustrating the lighting keyboard shown in FIG. 1.

Further referring to FIG. 4, FIG. 4 is a top view illustrating a partial region T1 of the lighting keyboard LKB shown in FIG. 1, wherein the keycap KCC, the support mechanism SSR, the trigger element TE and the restoration member RE are omitted in FIG. 4.

Two heat-dissipating keys KS in the partial region T1 respectively have a keycap projected area KCCP of the keycap KCC, and each electric circuit portion of the key circuit board MEM extends across a range of the keycap projected area KCCP. Moreover, as shown in FIGS. 3 and 4, a rib portion (comprising the surrounding rib Sr0 and the bridge ribs Sr1) of the support plate SUP extends across the range of the keycap projected area KCCP. Corresponding to a single heat-dissipating keys KS, the penetration channel PC may include a left penetration channel PC-L and a right penetration channel PC-R. Two left penetration channels PC-L symmetrically correspond to two heat-dissipating keys KS and penetrate the lighting board LCB, the light guide panel LGP and the shielding sheet SS. Two right penetration channels PC-R also symmetrically correspond to the two heat-dissipating keys KS and penetrate the lighting board LCB, light guide panel LGP and shielding sheeting SS. Each of the two left penetration channels PC-L is provided with a left light-reducing pattern LRP-L at their periphery. Two left diffusion patterns DP-L are provided on the upper side and the lower side of each left light-reducing pattern LRP-L. Each of the two right penetration channels PC-R is provided with a right light-reducing pattern LRP-R at its periphery. Two right diffusion patterns DP-R are provided on the upper side and the lower side of each right light-reducing pattern LRP-R. That is, the light-reducing pattern LRP may include the left light-reducing pattern LRP-L and the right light-reducing pattern LRP-R to correspond to a single heat-dissipating key KS, and the diffusion pattern DP may include the left diffusion pattern DP-L and the right diffusion pattern DP-R to correspond to a single heat-dissipating key KS. Two diffusion patterns DP are provided near each of light-reducing patterns LRP. From top view in the Z direction, each of the light-reducing patterns LRP is located between two adjacent diffusion patterns DP.

The left light-reducing pattern LRP-L and the left diffusion pattern DP-L may constitute a left heat-reducing optical pattern group OPG-L, and the right light-reducing pattern LRP-R and the right diffusion pattern DP-R may constitute a right heat-reducing optical pattern group OPG-R. In this embodiment, the backlight module BLM has two penetration channels PC (i.e. one left penetration channel PC-L and one right penetration channel PC-R) to correspond to each heat-dissipating key KS. The left heat-reducing optical pattern group OPG-L and the right heat-reducing optical pattern group OPG-R, corresponding to each heat-dissipating key KS, are symmetrically located on opposite sides of each keycap projected area KCCP. In this embodiment, the two left heat-reducing optical pattern groups OPG-L corresponding to the two heat-dissipating keys KS have identical patterns, and the two right heat-reducing optical pattern groups OPG-R corresponding to the two heat-dissipating keys KS also have identical patterns. In practical applications, the electric circuit portion EC of the key circuit board MEM board of a square key may not be light-transparent and is not suitable to be above the diffusion pattern DP, so a longitudinal extending part of the electric circuit portion EC is preferably located between the left heat-reducing optical pattern group OPG-L and the right heat-reducing optical pattern group OPG-R corresponding to a single heat-dissipating key KS.

In practical applications, the rib portion (comprising the surrounding rib Sr0 and the bridge ribs Sr1) of the support plate SUP of a square key may not be light-transparent and is not suitable to be above the diffusion pattern DP, so the surrounding rib Sr0 and the bridge ribs Sr1 of the support plate SUP are preferably located between the left heat-reducing optical pattern group OPG-L and the right heat-reducing optical pattern group OPG-R corresponding to a single heat-dissipating key KS. That is, from top view in the Z direction, the left light-reducing pattern LRP-L and the left diffusion pattern DP-L are located on the same side of the electric circuit portion EC and on the same side of the rib portion (comprising the surrounding rib Sr0 and the bridge ribs Sr1) of the support plate SUP; the right light-reducing pattern LRP-R and the right diffusion pattern DP-R are located on the same side of the electric circuit portion EC and on the same side of the rib portion (comprising the surrounding rib Sr0 and the bridge ribs Sr1) of the support plate SUP. Moreover, from top view in the Z direction, the left light-reducing pattern LRP-L and the right light-reducing pattern LRP-R are located on opposite sides of the electric circuit portion EC and on opposite sides of the rib portion (comprising the surrounding rib Sr0 and the bridge ribs Sr1) of the support plate SUP; the left diffusion pattern DP-L and the right diffusion pattern DP-R are located on opposite sides of the electric circuit portion EC and on opposite sides of the rib portion (comprising the surrounding rib Sr0 and the bridge ribs Sr1) of the support plate SUP.

Figure 5:
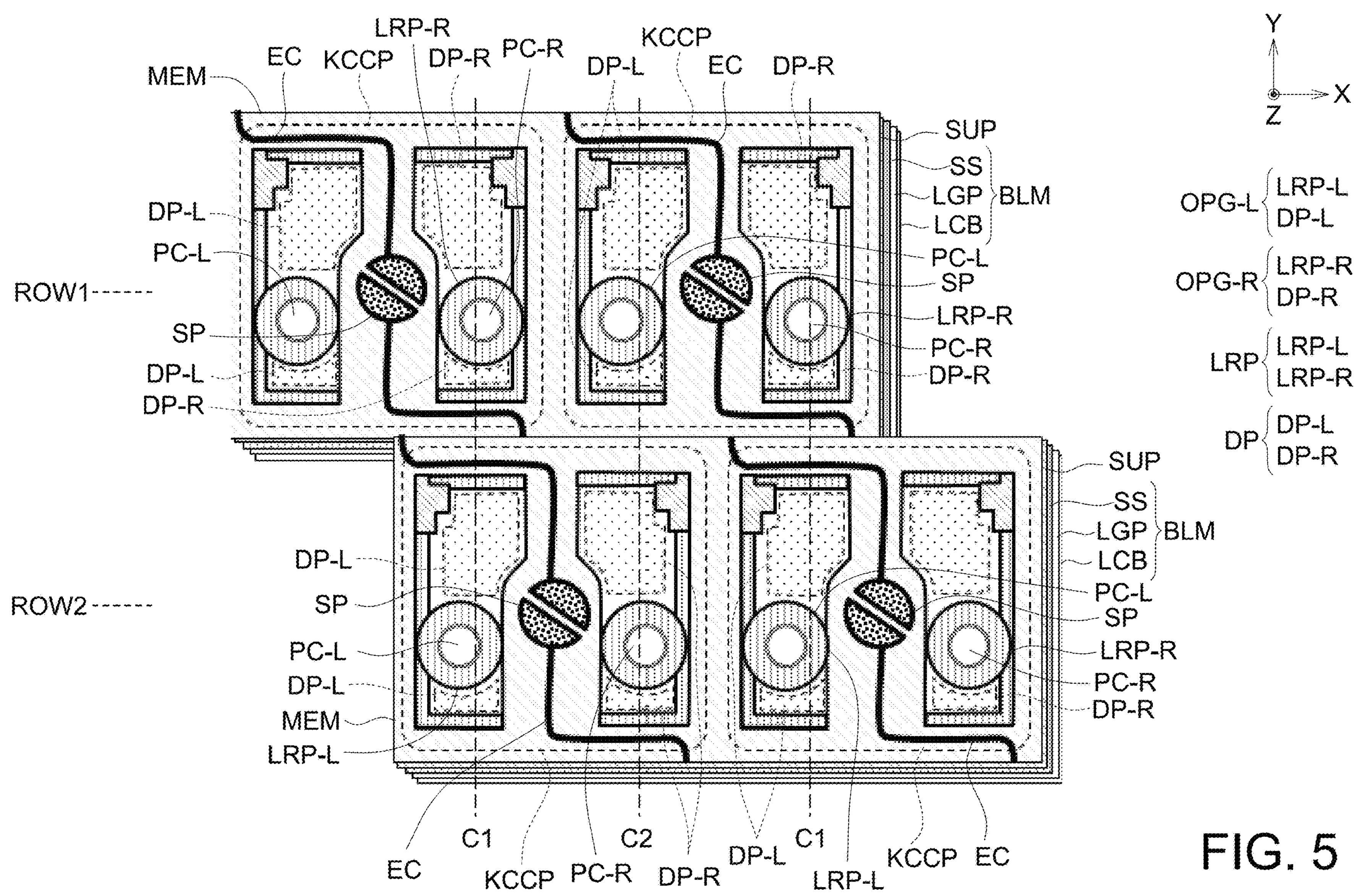
FIG. 5 is a partial top view illustrating the lighting keyboard shown in FIG. 1.

Further referring to FIG. 5, FIG. 5 is a top view illustrating a partial region T2 of the lighting keyboard LKB shown in FIG. 1, wherein the keycap KCC, the support mechanism SSR, the trigger element TE and the restoration member RE are omitted in FIG. 5. The four heat-dissipating keys KS in the partial area T2 can also have all the features described above, which will not repeated herein. The description regarding FIG. 5 mainly focuses on the features of the heat-dissipating keys KS in different rows of the lighting keyboard LKB.

As shown in FIG. 5, the heat-dissipating key KS located on the left side of an top row ROW1 and the heat-dissipating key KS located on the left side of a middle row ROW2 are adjacent in the Y direction but not aligned in the X direction; the heat-dissipating key KS located on the right side of the top row ROW1 and the heat-dissipating key KS located on the right side of the middle row ROW2 are adjacent in the Y direction but is not aligned in the X direction. The right heat-reducing optical pattern group OPG-R (constituted by the right light-reducing pattern LRP-R and the right diffusion pattern DP-R) corresponding to the heat-dissipating key KS located on the left side of the top row ROW1 at least partially overlaps the left heat-reducing optical pattern group OPG-L (constituted by the left light-reducing pattern LRP-L and the left diffusion pattern DP-L) of the heat-dissipating key KS located on the left side of the middle row ROW2 in the Y direction. That is, these two partially overlapping heat-reducing optical pattern groups form an alignment line C1. Furthermore, the right heat-reducing optical pattern group OPG-R (constituted by the right light-reducing pattern LRP-R and the right diffusion pattern DP-R) corresponding to the heat-dissipating key KS located on the right side of the top row ROW1 at least partially overlaps the left heat-reducing optical pattern group OPG-L (constituted by the left light-reducing pattern LRP-L and the left diffusion pattern DP-L) of the heat-dissipating key KS located on the right side of the middle row ROW2 in the Y direction. That is, these two partially overlapping heat-reducing optical pattern groups also form the alignment line C1.

Furthermore, the left heat-reducing optical pattern group OPG-L (constituted by the left light-reducing pattern LRP-L and the left diffusion pattern DP-L) corresponding to the heat-dissipating key KS located on the right side of the top row ROW1 at least partially overlaps the right heat-reducing optical pattern group OPG-R (constituted by the right light-reducing pattern LRP-R and the right diffusion pattern DP-R) of the heat-dissipating key KS located on the left side of the middle row ROW2 in the Y direction. That is, these two partially overlapping heat-reducing optical pattern groups form an alignment line C2. In brief, the alignment line C1 is formed by the right heat-reducing optical pattern group OPG-R of a higher row and the right heat-reducing optical pattern group OPG-R of a lower row, which correspond to two heat-dissipating keys KS being adjacent in the Y direction but not aligned in the X direction; the alignment line C2 is formed by the left heat-reducing optical pattern group OPG-L of a higher row and the right heat-reducing optical pattern group OPG-R of a lower row, which correspond to the two heat-dissipating keys KS that are adjacent in the Y direction but misaligned in the X direction. FIG. 5 shows a special arrangement in which the heat-dissipating keys KS of two adjacent rows in the lighting keyboard LKB are offset by ½ of the key center.

Figure 6:
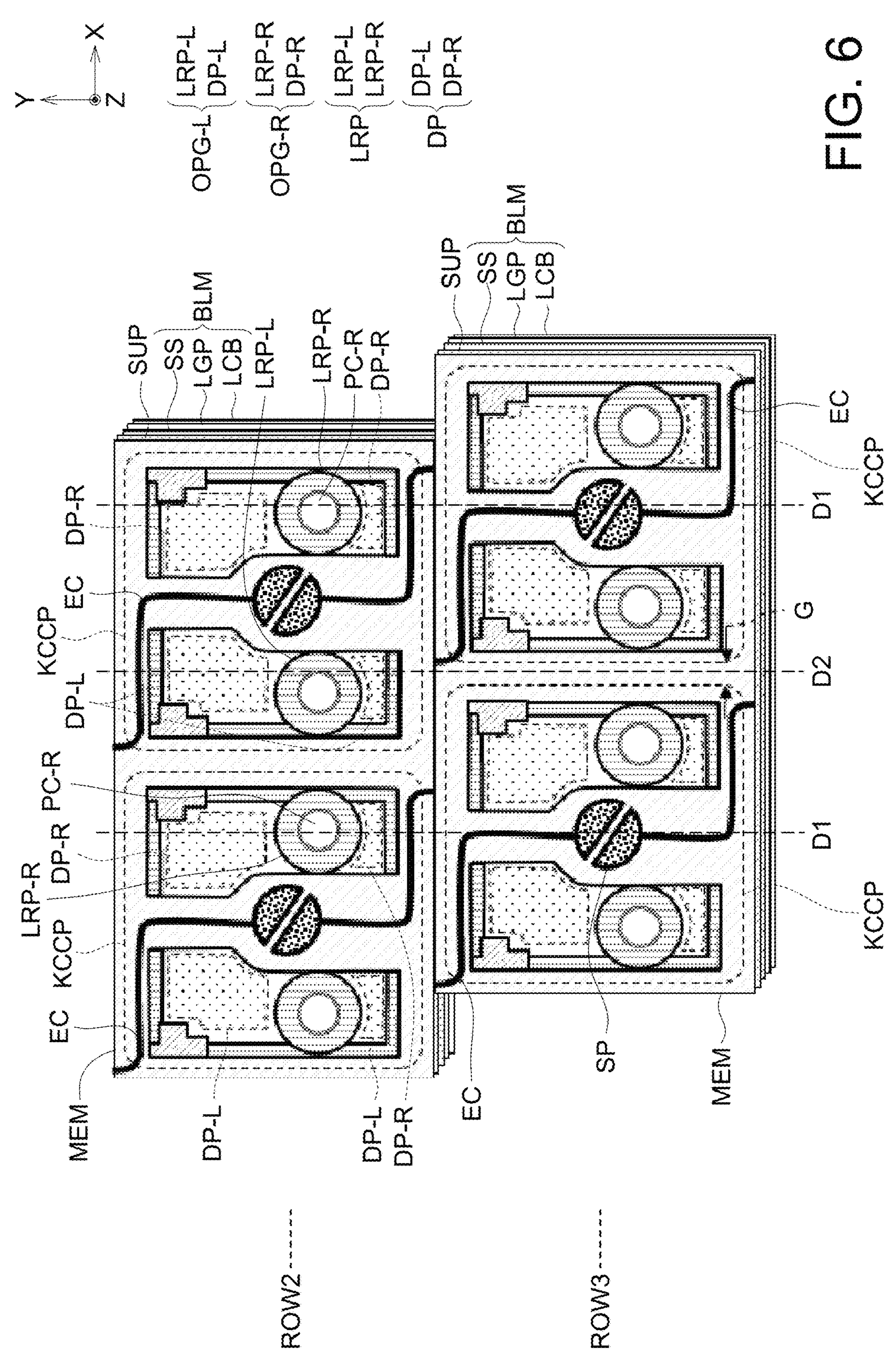
FIG. 6 is a partial top view illustrating the lighting keyboard shown in FIG. 1.

Further referring to FIG. 6, FIG. 6 is a top view illustrating a partial region T3 of the lighting keyboard LKB shown in FIG. 1, wherein the keycap KCC, the support mechanism SSR, the trigger element TE and the restoration member RE are omitted in FIG. 6. The four heat-dissipating keys KS in the partial area T3 can also have all the features described above, which will not repeated herein. The description regarding FIG. 6 mainly focuses on the features of the heat-dissipating keys KS in different rows of the lighting keyboard LKB.

As shown in FIG. 6, the heat-dissipating key KS located on the left side of the middle row ROW2 and the heat-dissipating key KS located on the left side of a bottom row ROW3 are adjacent in the Y direction but not aligned in the X direction; the heat-dissipating key KS located on the right side of the middle row ROW2 and the heat-dissipating key KS located on the right side of the bottom row ROW3 are adjacent in the Y direction but is not aligned in the X direction. The right heat-reducing optical pattern group OPG-R (constituted by the right light-reducing pattern LRP-R and the right diffusion pattern DP-R) corresponding to the heat-dissipating key KS located on the left side of the middle row ROW2 at least partially overlaps the switch pad SP corresponding to the heat-dissipating key KS located on the left side of the bottom row ROW3 in the Y direction. That is, this right heat-reducing optical pattern group and this switch pad SP that partially overlap each other form an alignment line D1. Moreover, the right heat-reducing optical pattern group OPG-R (constituted by the right light-reducing pattern LRP-R and the right diffusion pattern DP-R) corresponding to the heat-dissipating key KS located on the right side of the middle row ROW2 at least partially overlaps the switch pad SP corresponding to the heat-dissipating key KS located on the right side of the bottom row ROW3 in the Y direction. That is, this right heat-reducing optical pattern group and this switch pad SP that partially overlap each other also form the alignment line D1.

Furthermore, the left heat-reducing optical pattern group OPG-L (constituted by the left light-reducing pattern LRP-L and the left diffusion pattern DP-L) corresponding to the heat-dissipating key KS located on the right side of the middle row ROW2 at least partially overlaps a gap region G exterior to the heat-dissipating keys located on the left side or the right side of the bottom row ROW3 in the Y direction. That is, this left heat-reducing optical pattern group and this gap region G that partially overlap each other also form an alignment line D2. In brief, the alignment line D1 is formed by the right heat-reducing optical pattern group OPG-R of a higher row and a switch pad SP of a lower row, which correspond to two heat-dissipating keys KS being adjacent in the Y direction but not aligned in the X direction; the alignment line D2 is formed by the left heat-reducing optical pattern group OPG-L of a higher row and a gap region G of a lower row, which correspond to the two heat-dissipating keys KS that are adjacent in the Y direction but misaligned in the X direction. FIG. 6 shows a special arrangement in which the heat-dissipating keys KS of two adjacent rows in the lighting keyboard LKB are offset by ¼ of the key center.

As mentioned in the above, the present invention makes at least one penetration channel on the lighting keyboard and the backlight module therefor. Accordingly, the through-channel can be configured to dissipate heat in the heat region under the heat-dissipating keys, thereby improving the heat dissipation efficiency of the lighting keyboard. Furthermore, the present invention also makes a light-reducing pattern at periphery of the penetration channel to block light and adjacent diffusion patterns for guiding the light to illuminate the heat-dissipating key, so as to enhance the overall illuminating consistency and to solve the problem of the upward or downward light leakage in the penetration channel.

In another aspect, the lighting keyboard according to embodiments of the present invention may further comprise at least one specific function key to correspond to a specific function of an electronic device to which it is connected or disposed. The specific function may, for example, be an artificial intelligence (AI)-assisted function. When a user presses the specific function key, the AI-assisted function is activated. The backlight module of the lighting keyboard may have a special design and configuration to correspond to the specific function key.

Figure 7A:
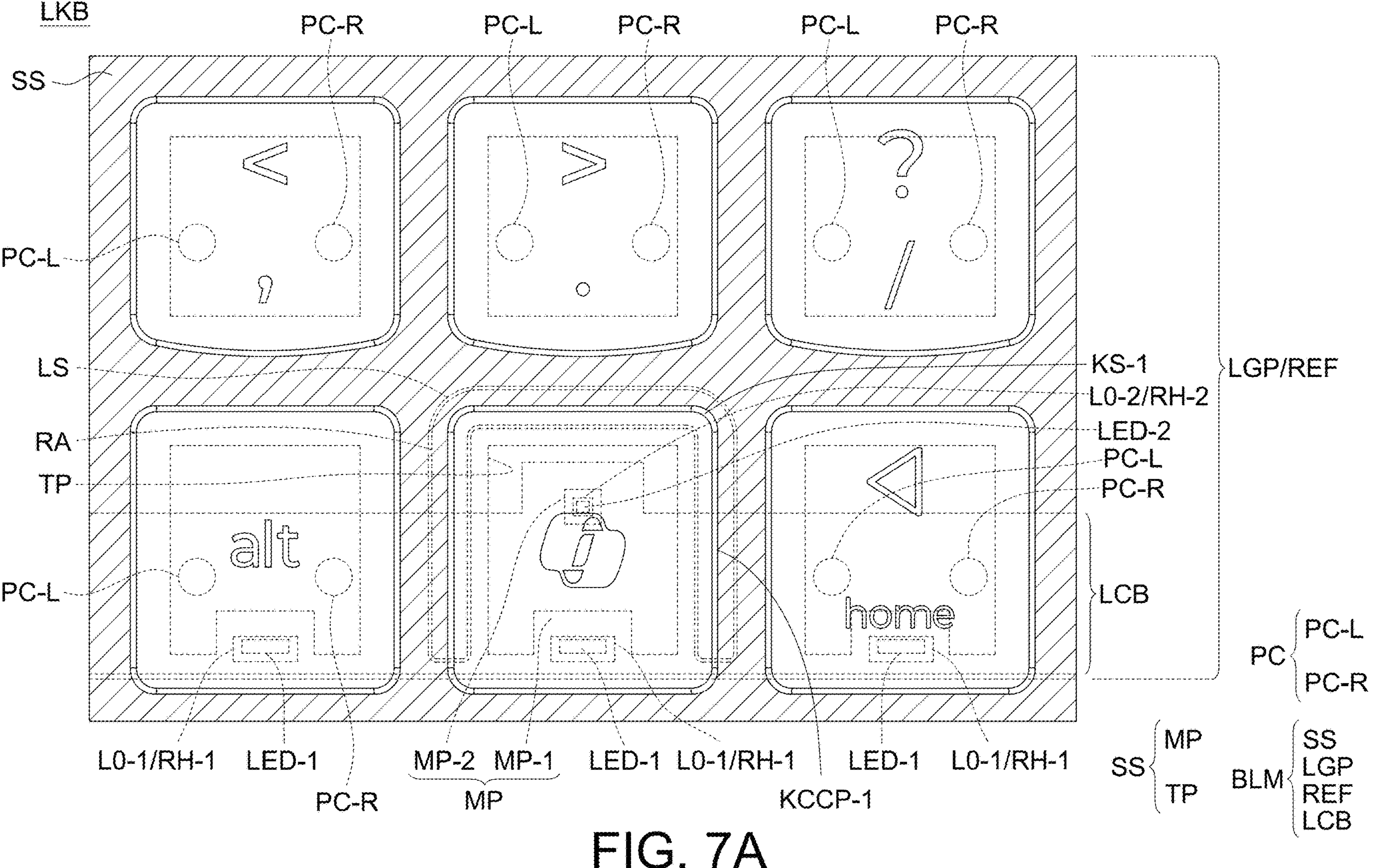
FIG. 7A is a top schematic view illustrating the stacking of a backlight module and a specific function key of the lighting keyboard, according to another embodiment of the present invention.
Figure 7B:
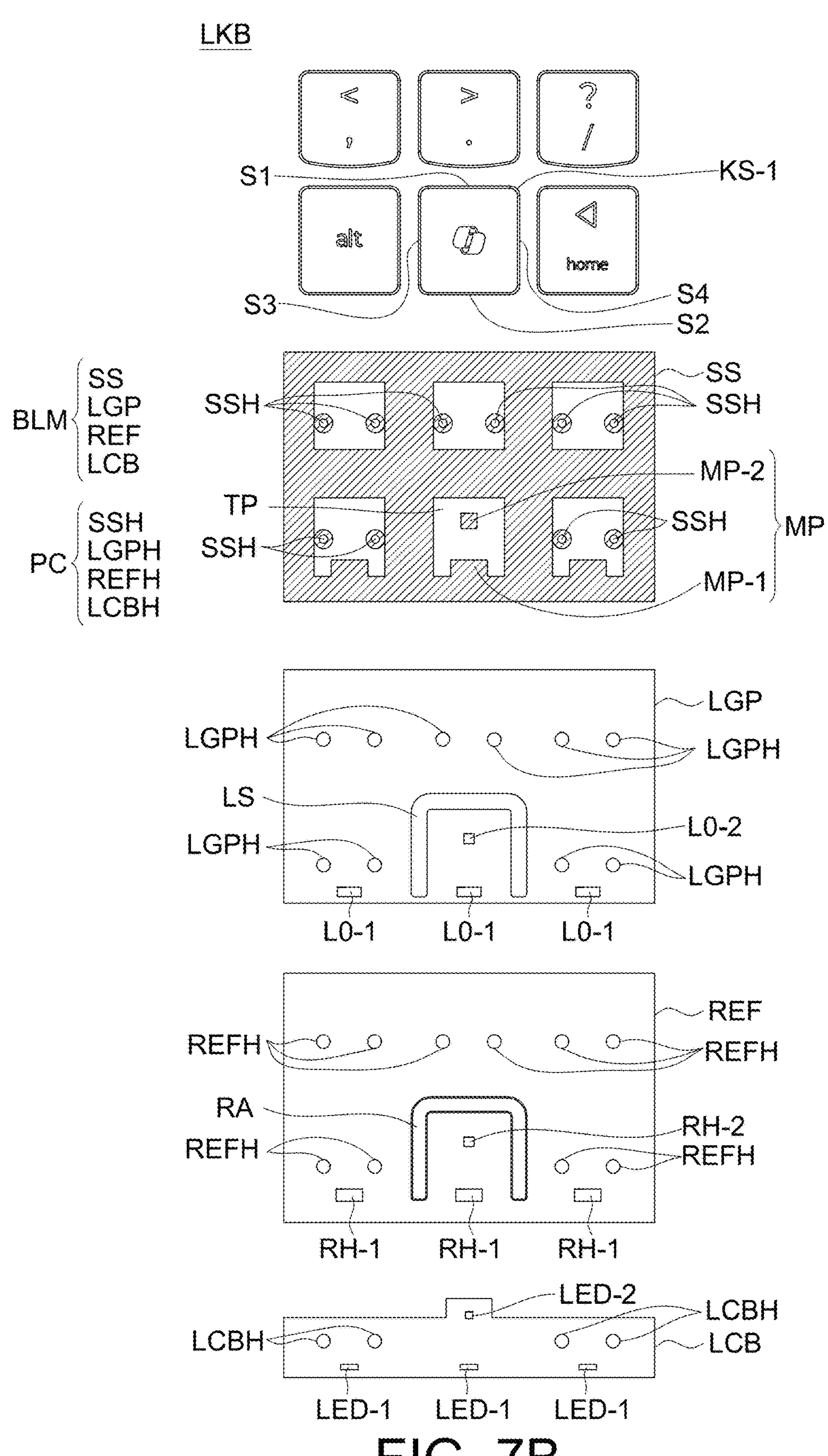
FIG. 7B is an exploded layered view of the backlight module and the specific function key corresponding to the embodiment shown in FIG. 7A.

Referring to FIGS. 7A to 7B, FIG. 7A is a top schematic view of a specific function key KS-1 and a backlight module BLM of an lighting keyboard LKB according to another embodiment of the present invention, and FIG. 7B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP and key circuit board MEM, which may be disposed above the backlight module BLM. However, since this embodiment does not involve any special design or configuration for the support plate SUP and key circuit board MEM, they are omitted in FIGS. 7A to 7B for simplicity of illustration.

As shown in FIGS. 7A to 7B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1 and a second light emitting unit LED-2. The first and second light emitting units LED-1 and LED-2 may be, for example, light emitting diodes. In this embodiment, the first light emitting unit LED-1 is a side-view LED, and the second light emitting unit LED-2 is a top-view LED. The first light emitting unit LED-1 may provide general backlighting for the lighting keyboard LKB, and thus may be provided in plural numbers. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. The first and second light emitting units LED-1 and LED-2 are respectively disposed adjacent to two opposite sides of a keycap projection area KCCP-1 of the specific function key KS-1, wherein the first light emitting unit LED-1 is adjacent to a side S2, and the second light emitting unit LED-2 is adjacent to a side S1.

As shown in FIGS. 7A to 7B, the light guide panel LGP includes a first light guide hole L0-1 and a second light guide hole L0-2. The first light emitting unit LED-1 may be located in the first light guide hole L0-1, and the second light emitting unit LED-2 may be located in the second light guide hole L0-2. The light guide panel LGP may include an adhesive disposed on a top surface and/or a bottom surface thereof, in proximity to the first light guide hole L0-1 and the second light guide hole L0-2. The adhesive surrounds the first light guide hole L0-1 and the second light guide hole L0-2, and is configured to respectively bond the shielding sheet SS and/or the lighting board LCB. Since the first and second light guide holes L0-1 and L0-2 are aligned respectively with the first and second light emitting units LED-1 and LED-2, the first and second light guide holes L0-1 and L0-2 are also respectively disposed adjacent to two opposite sides of the keycap projection area KCCP-1 of the specific function key KS-1. That is, the first light guide hole L0-1 is adjacent to the side S2, and the second light guide hole L0-2 is adjacent to the side S1. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, wherein the side S3 and the side S4 are adjacent sides connected to the side S1 and the side S2.

As shown in FIGS. 7A to 7B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1 and an inner block portion MP-2. The outer frame portion MP-1 surrounds the light transmitting portion TP, and the inner block portion MP-2 is located within located within a range of the light transmitting portion TP. The masking portion MP overlaps in projection with the first and second light emitting units LED-1 and LED-2. Specifically, in the stacking (vertical) direction, the first light emitting unit LED-1 overlaps in projection with the outer frame portion MP-1, and the second light emitting unit LED-2 overlaps in projection with the inner block portion MP-2. The masking portion MP functions as a means for adjusting the light output from the first and second light emitting units LED-1 and LED-2 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1, but does not overlap in projection with the inner block portion MP-2. The light guide panel slot LS surrounds the light transmitting portion TP, and does not overlap in projection with the light transmitting portion TP.

Furthermore, as shown in FIGS. 7A to 7B, the backlight module BLM may further include a reflective layer REF. The reflective layer REF may be disposed between the light guide panel LGP and the lighting board LCB. The reflective layer REF may include a first reflective layer hole RH-1 and a second reflective layer hole RH-2 corresponding to the first and second light emitting units LED-1 and LED-2. The first light emitting unit LED-1 may be disposed in the first reflective layer hole RH-1, and the second light emitting unit LED-2 may be disposed in the second reflective layer hole RH-2. The first light guide hole L0-1 and the first reflective layer hole RH-1 are vertically aligned, and the second light guide hole L0-2 and the second reflective layer hole RH-2 are vertically aligned. Thus, the first light emitting unit LED-1 may pass through both the first light guide hole L0-1 and the first reflective layer hole RH-1, and the second light emitting unit LED-2 may pass through both the second light guide hole L0-2 and the second reflective layer hole RH-2. The reflective layer REF may further include an attachment portion RA. The attachment portion RA corresponds in shape to the light guide panel slot LS and is also in an inverted U-shape. The light guide panel slot LS and the attachment portion RA are vertically aligned. The attachment portion RA overlaps in projection with the masking portion MP of the shielding sheet SS and with the boundary of the keycap projection area KCCP-1. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS, but it is not limited thereto. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink.

Figure 8A:
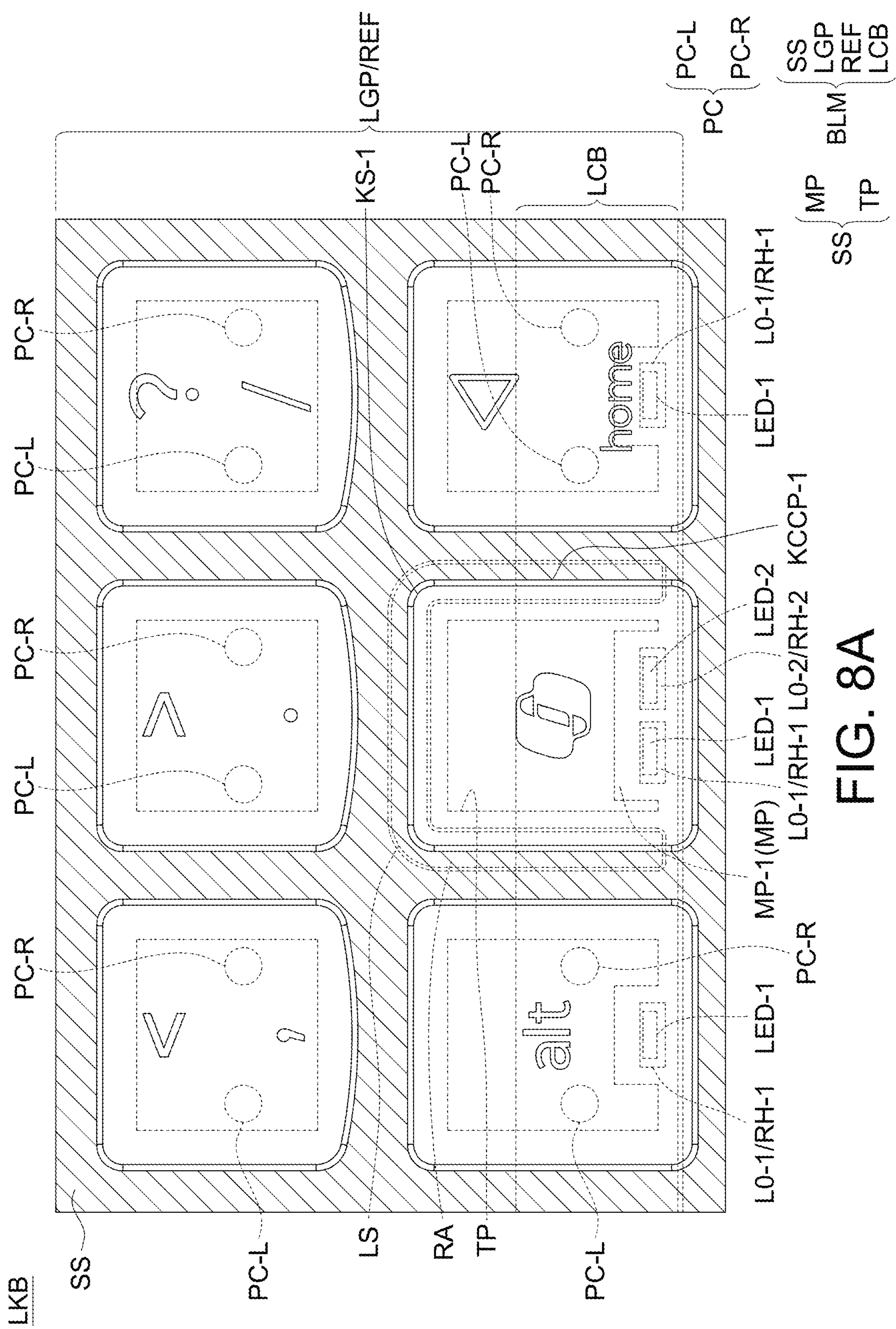
FIG. 8A is a top schematic view illustrating the stacking of a backlight module and a specific function key of the lighting keyboard, according to another embodiment of the present invention.
Figure 8B:
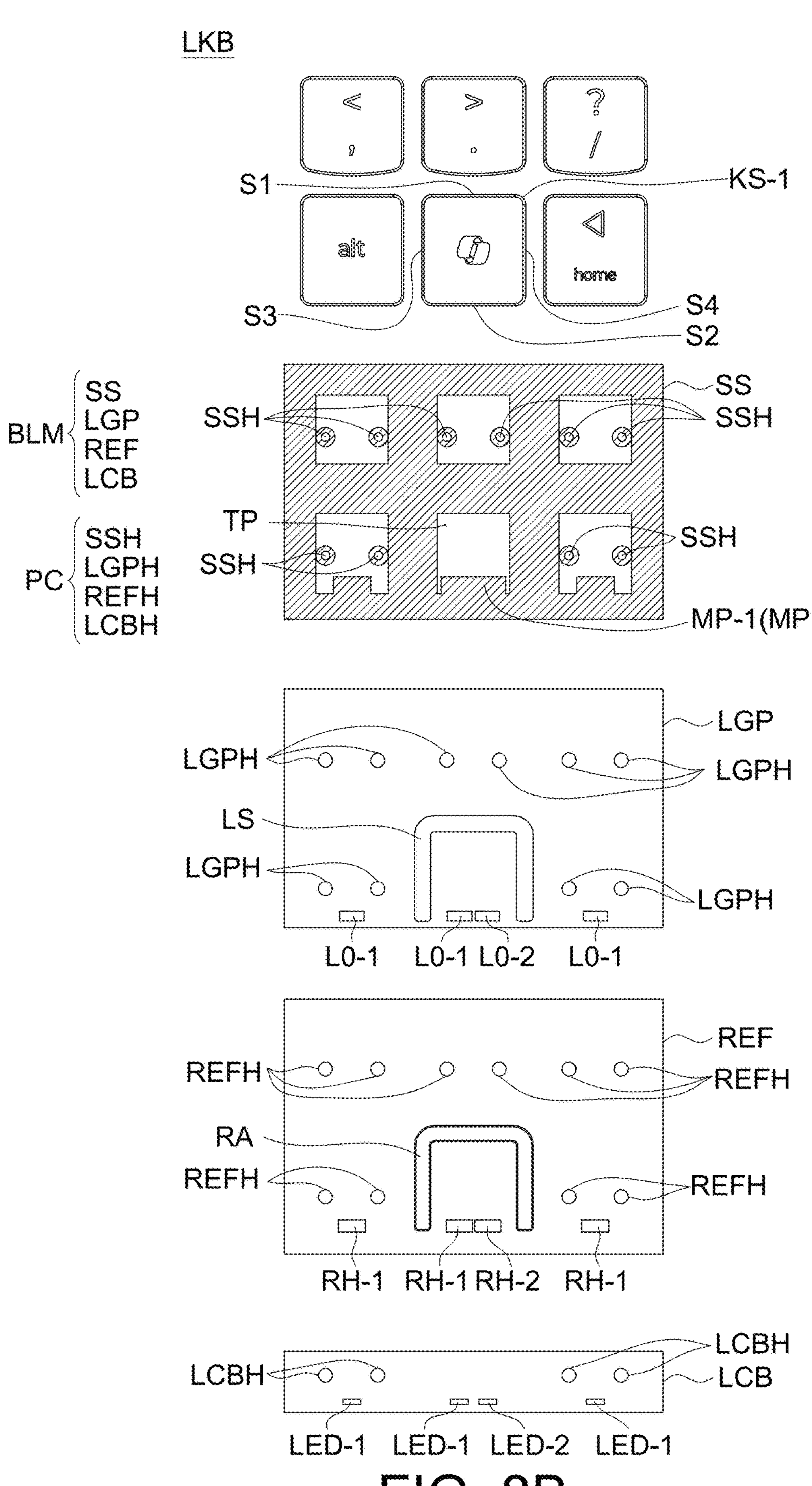
FIG. 8B is an exploded layered view of the backlight module and the specific function key corresponding to the embodiment shown in FIG. 8A.

Referring to FIGS. 8A to 8B, FIG. 8A is a top schematic view of a specific function key KS-1 and a backlight module BLM of an lighting keyboard LKB according to another embodiment of the present invention, and FIG. 8B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP and key circuit board MEM, which may be disposed above the backlight module BLM. However, since this embodiment does not involve any special design or configuration for the support plate SUP and key circuit board MEM, they are omitted in FIGS. 8A to 8B for simplicity of illustration.

As shown in FIGS. 8A to 8B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1 and a second light emitting unit LED-2. The first and second light emitting units LED-1 and LED-2 may be, for example, light emitting diode. In this embodiment, both the first light emitting unit LED-1 and the second light emitting unit LED-2 are side-view LEDs, to emit light toward a side S1 of a keycap projection area KCCP-1 of a specific function key KS-1. The first light emitting unit LED-1 may provide general backlighting for the lighting keyboard LKB, and thus may be provided in plural numbers. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. Further, in this embodiment, a light color of the first light emitting unit LED-1 and a light color of the second light emitting unit LED-2 may be configured to be different, such that the dedicated backlighting of the specific function key KS-1 is distinguishable from the general backlighting of other keys. The first and second light emitting units LED-1 and LED-2 are disposed both adjacent to a side S2 of a keycap projection area KCCP-1 of the specific function key KS-1. The first light emitting unit LED-1 and the second light emitting unit LED-2 are arranged side by side and configured to emit light in the same direction, namely toward the side S1.

As shown in FIGS. 8A to 8B, the light guide panel LGP includes a first light guide hole L0-1 and a second light guide hole L0-2. The first light emitting unit LED-1 may be located in the first light guide hole L0-1, and the second light emitting unit LED-2 may be located in the second light guide hole L0-2. The light guide panel LGP may include an adhesive disposed on a top surface and/or a bottom surface thereof, in proximity to the first light guide hole L0-1 and the second light guide hole L0-2. The adhesive surrounds the first light guide hole L0-1 and the second light guide hole L0-2, and is configured to respectively bond the shielding sheet SS and/or the lighting board LCB. Since the first and second light guide holes L0-1 and L0-2 are aligned respectively with the first and second light emitting units LED-1 and LED-2, the first and second light guide holes L0-1 and L0-2 are disposed adjacent to the side S2 of the keycap projection area KCCP-1 of the specific function key KS-1, and are arranged side by side. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, and the light guide panel slot LS does not overlap in projection with the side S2 where the first light emitting unit LED-1 and the second light emitting unit LED-2 are adjacent, wherein the side S3 and the side S4 are adjacent sides connected to the side S1 and the side S2.

As shown in FIGS. 8A to 8B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1. The outer frame portion MP-1 surrounds the light transmitting portion TP. The masking portion MP overlaps in projection with the first and second light emitting units LED-1 and LED-2. Specifically, in the stacking (vertical) direction, the outer frame portion MP-1 overlaps in projection with the first light emitting unit LED-1 and the second light emitting unit LED-2. The masking portion MP functions as a means for adjusting the light output from the first and second light emitting units LED-1 and LED-2 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1. The light guide panel slot LS surrounds the light transmitting portion TP, and does not overlap in projection with the light transmitting portion TP.

Furthermore, as shown in FIGS. 8A to 8B, the backlight module BLM may further include a reflective layer REF. The reflective layer REF may be disposed between the light guide panel LGP and the lighting board LCB. The reflective layer REF may include a first reflective layer hole RH-1 and a second reflective layer hole RH-2 corresponding to the first and second light emitting units LED-1 and LED-2. The first light emitting unit LED-1 may be disposed in the first reflective layer hole RH-1, and the second light emitting unit LED-2 may be disposed in the second reflective layer hole RH-2. The first light guide hole L0-1 and the first reflective layer hole RH-1 are vertically aligned, and the second light guide hole L0-2 and the second reflective layer hole RH-2 are vertically aligned. Thus, the first light emitting unit LED-1 may pass through both the first light guide hole L0-1 and the first reflective layer hole RH-1, and the second light emitting unit LED-2 may pass through both the second light guide hole L0-2 and the second reflective layer hole RH-2. The reflective layer REF may further include an attachment portion RA. The attachment portion RA corresponds in shape to the light guide panel slot LS and is also in an inverted U-shape. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink, but it is not limited thereto.

Figure 9A:
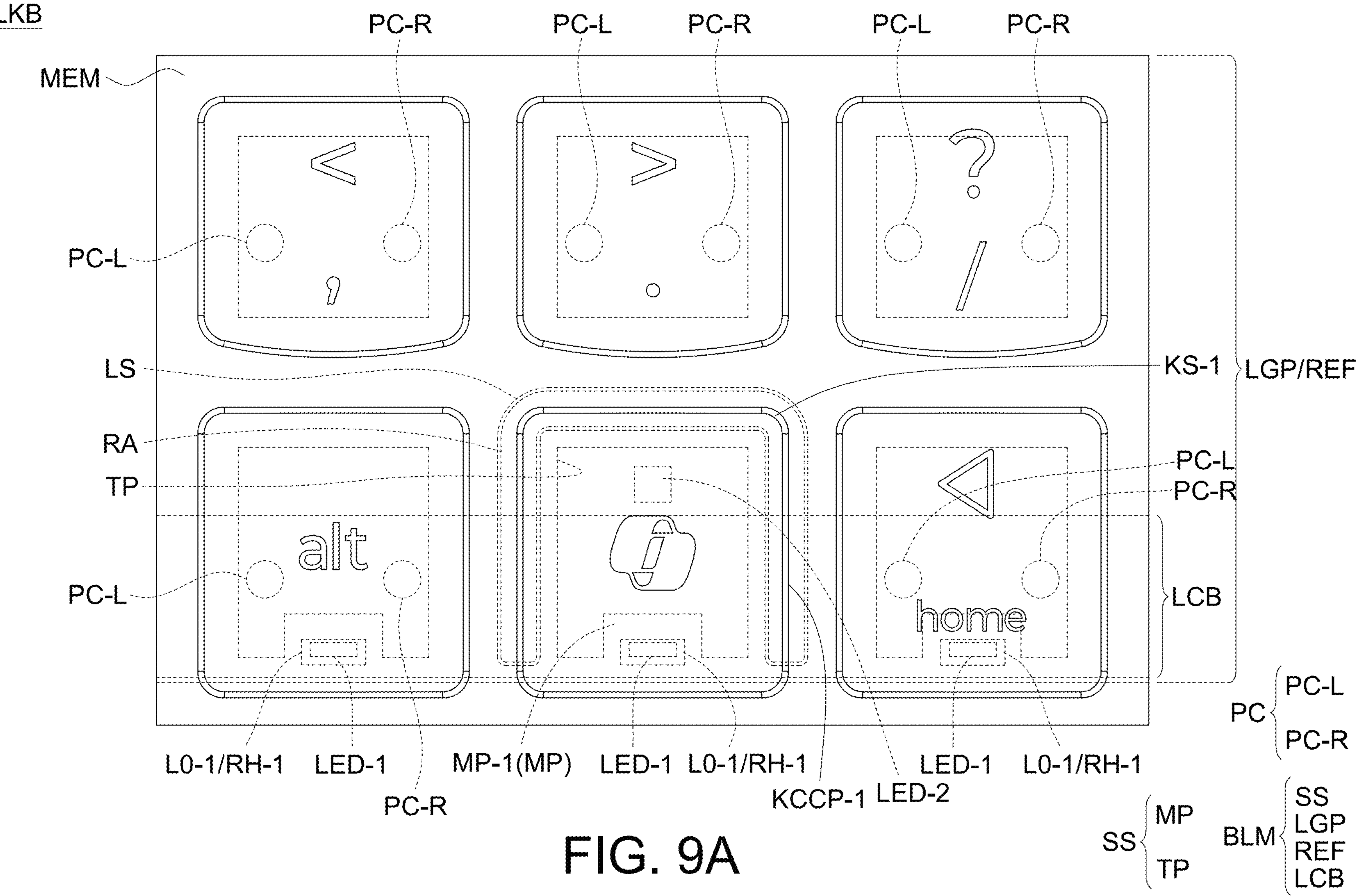
FIG. 9A is a top schematic view illustrating the stacking of a backlight module and a specific function key of the lighting keyboard, according to another embodiment of the present invention.
Figure 9B:
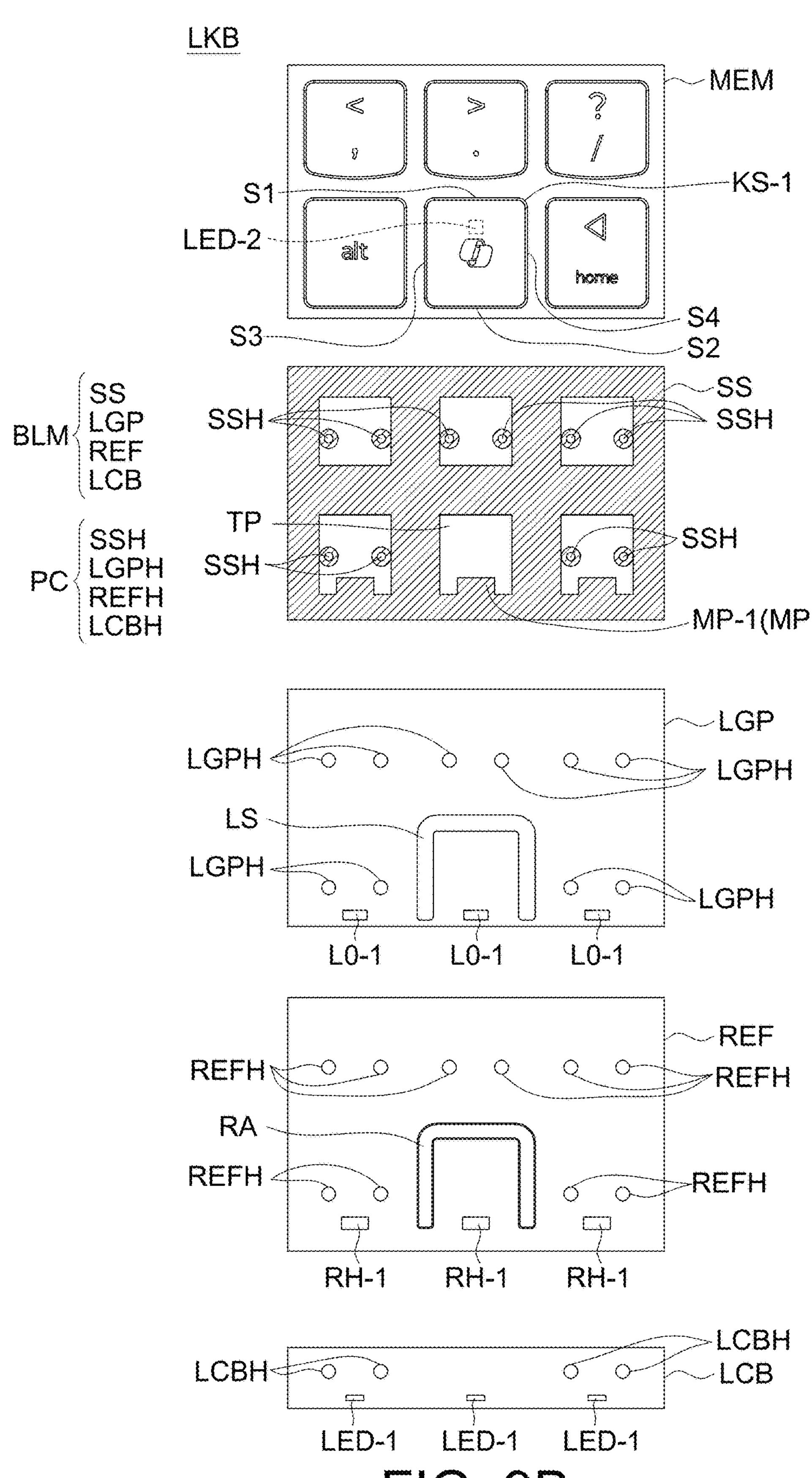
FIG. 9B is an exploded layered view of the backlight module and the specific function key corresponding to the embodiment shown in FIG. 9A.

Referring to FIGS. 9A to 9B, FIG. 9A is a top schematic view of a specific function key KS-1 and a backlight module BLM of an lighting keyboard LKB according to another embodiment of the present invention, and FIG. 9B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP, which may be disposed above the backlight module BLM and below the key circuit board MEM. However, since this embodiment does not involve any special design or configuration for the support plate SUP, it is omitted in FIGS. 9A to 9B for simplicity of illustration.

As shown in FIGS. 9A to 9B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1. The first light emitting unit LED-1 may be, for example, a light emitting diode. In this embodiment, the first light emitting unit LED-1 is a side-view LED, to emit light toward a side S1 of a keycap projection area KCCP-1 of a specific function key KS-1. The first light emitting unit LED-1 may provide general backlighting for the lighting keyboard LKB, and thus may be provided in plural numbers. The specific function key KS-1 may include a key circuit board MEM. The difference from the embodiments illustrated in FIGS. 7A to 7B and 8A to 8B lies in that, in this embodiment, the key circuit board MEM may include the second light emitting unit LED-2 i.e., the second light emitting unit LED-2 is not disposed on the lighting board LCB. The second light emitting unit LED-2 may be disposed on the top surface of the key circuit board MEM, thereby being located on a different layer of the lighting keyboard LKB from the first light emitting unit LED-1. The second light emitting unit LED-2 is, for example, a light emitting diode. In this embodiment, the second light emitting unit LED-2 is a top-view LED. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. The first and second light emitting units LED-1 and LED-2 are respectively disposed adjacent to two opposite sides of a keycap projection area KCCP-1 of the specific function key KS-1, wherein the first light emitting unit LED-1 is adjacent to a side S2, and the second light emitting unit LED-2 is adjacent to a side S1.

As shown in FIGS. 9A to 9B, the light guide panel LGP includes a first light guide hole L0-1. The first light emitting unit LED-1 may be located in the first light guide hole L0-1. The light guide panel LGP may include an adhesive disposed on a top surface and/or a bottom surface thereof, in proximity to the first light guide hole L0-1. The adhesive surrounds the first light guide hole L0-1, and is configured to bond the shielding sheet SS and/or the lighting board LCB. Since the first light guide hole L0-1 is aligned with the first light emitting unit LED-1, the first light guide hole L0-1 is disposed adjacent to a side S2 of the keycap projection area KCCP-1 of the specific function key KS-1. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, and the light guide panel slot LS does not overlap in projection with the side S2 where the first light emitting unit LED-1 is adjacent, wherein the side S3 and the side S4 are adjacent sides connected to the side S1 and the side S2.

As shown in FIGS. 9A to 9B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1. The outer frame portion MP-1 surrounds the light transmitting portion TP. The masking portion MP overlaps in projection with the first light emitting unit LED-1. Specifically, in the stacking (vertical) direction, the first light emitting unit LED-1 overlaps in projection with the outer frame portion MP-1. The masking portion MP functions as a means for adjusting the light output from the first light emitting unit LED-1 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1. The light guide panel slot LS surrounds the light transmitting portion TP, and does not overlap in projection with the light transmitting portion TP. The second light emitting unit LED-2 overlaps in projection with the light transmitting portion TP. That is, in a top view along the stacking (vertical) direction, the second light emitting unit LED-2 is located within a range of the light transmitting portion TP.

Furthermore, as shown in FIGS. 9A to 9B, the backlight module BLM may further include a reflective layer REF. The reflective layer REF may be disposed between the light guide panel LGP and the lighting board LCB. The reflective layer REF may include a first reflective layer hole RH-1 corresponding to the first light emitting unit LED-1. The first light emitting unit LED-1 may be disposed in the first reflective layer hole RH-1. The first light guide hole L0-1 and the first reflective layer hole RH-1 are vertically aligned. Thus, the first light emitting unit LED-1 may pass through both the first light guide hole L0-1 and the first reflective layer hole RH-1. The reflective layer REF may further include an attachment portion RA. The attachment portion RA corresponds in shape to the light guide panel slot LS and is also in an inverted U-shape. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink, but it is not limited thereto.

Figure 10A:
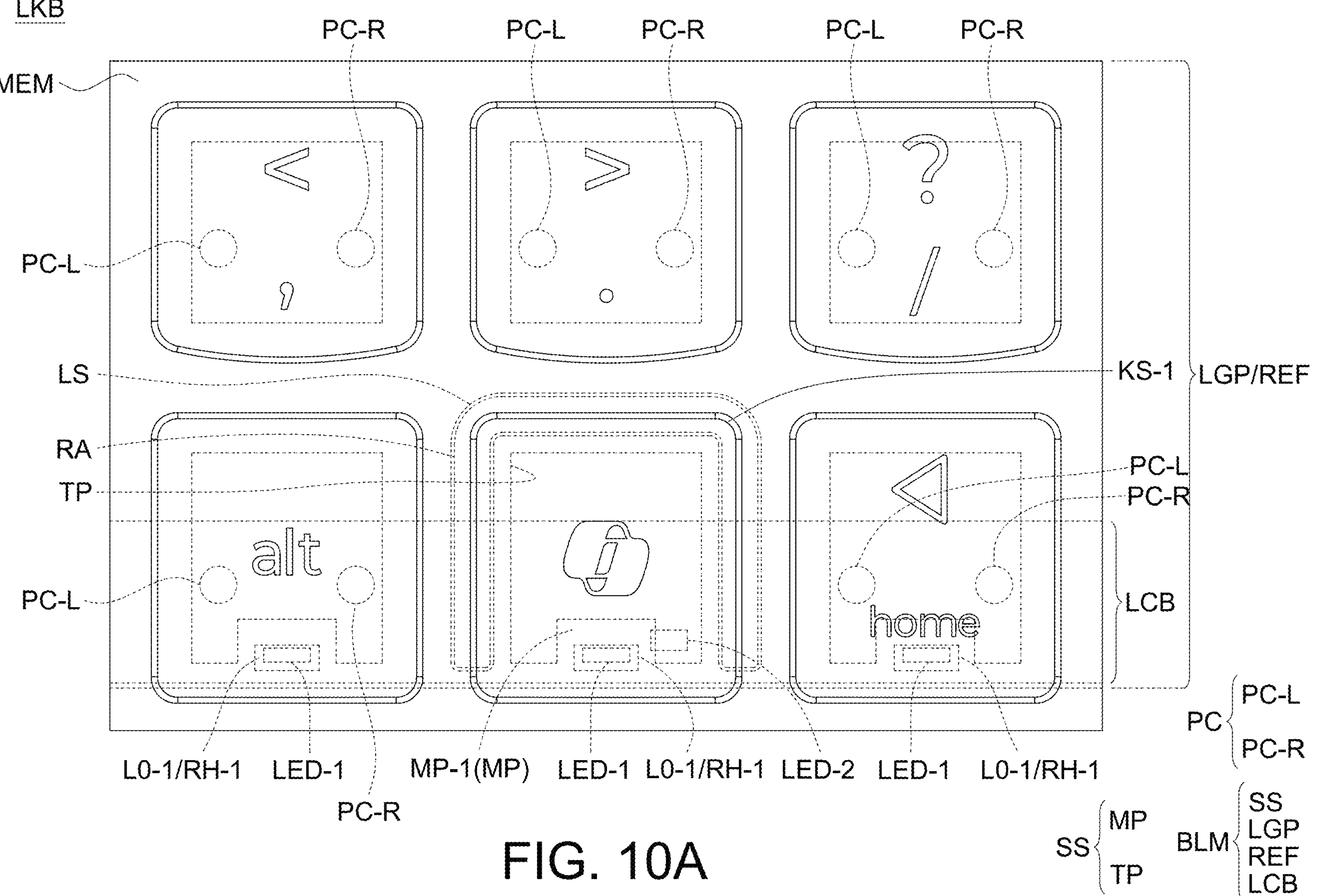
FIG. 10A is a top schematic view illustrating the stacking of a backlight module and a specific function key of the lighting keyboard, according to another embodiment of the present invention.
Figure 10B:
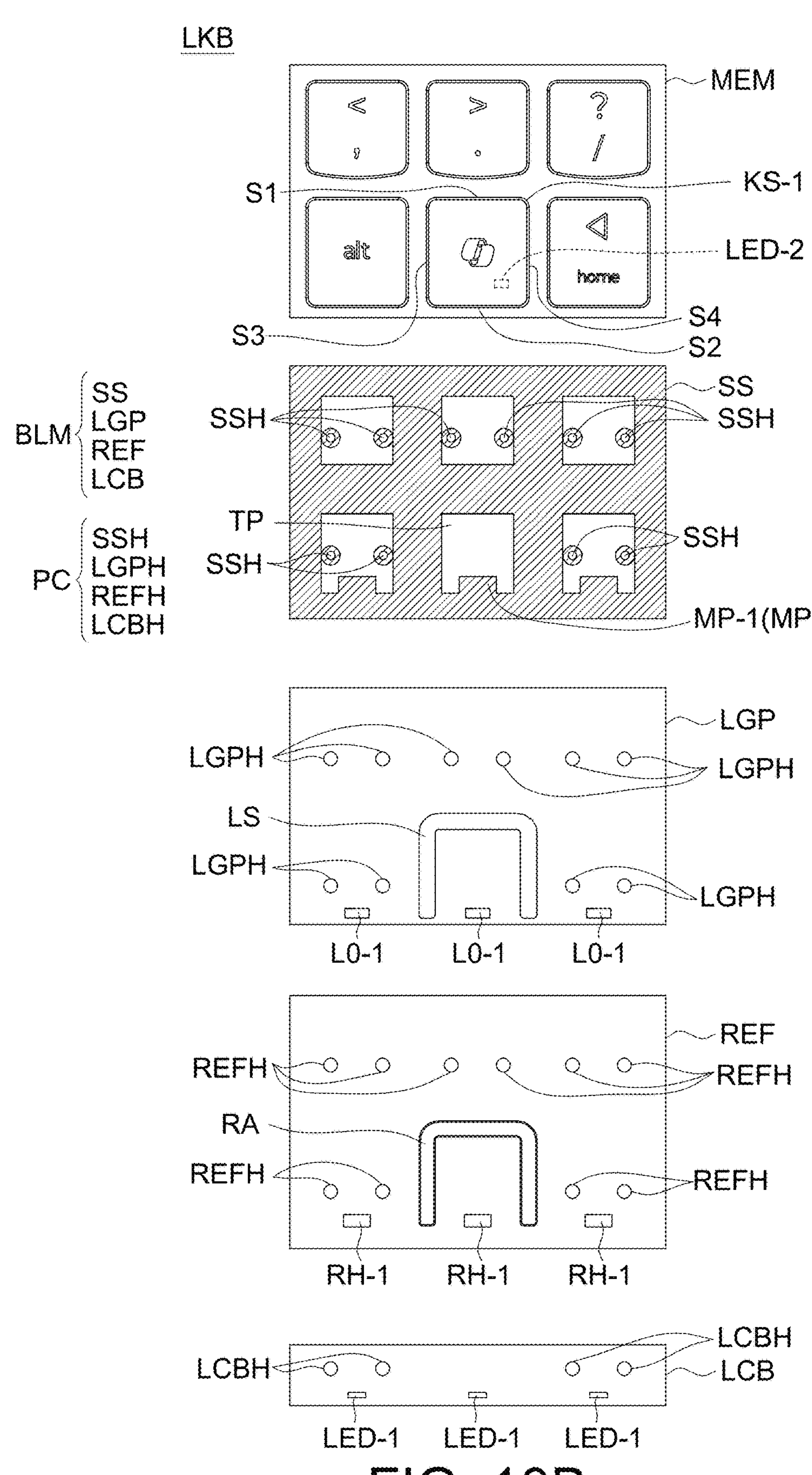
FIG. 10B is an exploded layered view of the backlight module and the specific function key corresponding to the embodiment shown in FIG. 10A.

Referring to FIGS. 10A to 10B, FIG. 10A is a top schematic view of a specific function key KS-1 and a backlight module BLM of an lighting keyboard LKB according to another embodiment of the present invention, and FIG. 10B is an exploded layered view of the specific function key KS-1 and the backlight module BLM. In this embodiment, the lighting keyboard LKB may comprise the backlight module BLM and the specific function key KS-1, wherein the specific function key KS-1 is located above the backlight module BLM. The backlight module BLM not only provides general backlighting for the entire lighting keyboard LKB, but also provides dedicated backlighting for the individual specific function key KS-1. It should be noted that in the lighting keyboard LKB of this embodiment, the specific function key KS-1 may include the aforementioned support plate SUP, which may be disposed above the backlight module BLM and below the key circuit board MEM. However, since this embodiment does not involve any special design or configuration for the support plate SUP, it is omitted in FIGS. 10A to 10B for simplicity of illustration.

As shown in FIGS. 10A to 10B, the backlight module BLM may comprise a lighting board LCB, a light guide panel LGP, and a shielding sheet SS. The shielding sheet SS, the light guide panel LGP, and the lighting board LCB are stacked in sequence from top to bottom. The lighting board LCB may include a first light emitting unit LED-1. The first light emitting unit LED-1 may be, for example, a light emitting diode. In this embodiment, the first light emitting unit LED-1 is a side-view LED, to emit light toward a side S1 of a keycap projection area KCCP-1 of a specific function key KS-1. The first light emitting unit LED-1 may provide general backlighting for the lighting keyboard LKB, and thus may be provided in plural numbers. The specific function key KS-1 may include a key circuit board MEM. The difference from the embodiments illustrated in FIGS. 7A to 7B and 8A to 8B lies in that, in this embodiment, the key circuit board MEM may include the second light emitting unit LED-2 i.e., the second light emitting unit LED-2 is not disposed on the lighting board LCB. The second light emitting unit LED-2 may be disposed on the top surface of the key circuit board MEM, thereby being located on a different layer of the lighting keyboard LKB from the first light emitting unit LED-1. The second light emitting unit LED-2 is, for example, a light emitting diode. In this embodiment, the second light emitting unit LED-2 is a side-view LED. The second light emitting unit LED-2 may provide dedicated backlighting for the specific function key KS-1, and the number thereof may depend on the number of specific function keys KS-1. Regarding the light emission configuration of the lighting board LCB, the first light emitting unit LED-1 and the second light emitting unit LED-2 may be configured to emit light simultaneously or alternately. Further, in this embodiment, a light color of the first light emitting unit LED-1 and a light color of the second light emitting unit LED-2 may be configured to be different, such that the dedicated backlighting of the specific function key KS-1 is distinguishable from the general backlighting of other keys. The first and second light emitting units LED-1 and LED-2 are disposed both adjacent to a side S2 of a keycap projection area KCCP-1 of the specific function key KS-1. The first light emitting unit LED-1 and the second light emitting unit LED-2 are arranged side by side and configured to emit light in the same direction, namely toward the side S1.

As shown in FIGS. 10A to 10B, the light guide panel LGP includes a first light guide hole L0-1. The first light emitting unit LED-1 may be located in the first light guide hole L0-1. The light guide panel LGP may include an adhesive disposed on a top surface and/or a bottom surface thereof, in proximity to the first light guide hole L0-1. The adhesive surrounds the first light guide hole L0-1, and is configured to bond the shielding sheet SS and/or the lighting board LCB. Since the first light guide hole L0-1 is aligned with the first light emitting unit LED-1, the first light guide hole L0-1 is disposed adjacent to the same side S2 of the keycap projection area KCCP-1 of the specific function key KS-1. The light guide panel LGP further includes a light guide panel slot LS. The light guide panel slot LS is in an inverted U-shape and surrounds the first and second light emitting units LED-1 and LED-2. In the stacking (vertical) direction, the light guide panel slot LS overlaps in projection with a boundary of the keycap projection area KCCP-1 of the specific function key KS-1. Specifically, the light guide panel slot LS overlaps with the side S1, a side S3 and a side S4 of the keycap projection area KCCP-1, and the light guide panel slot LS does not overlap in projection with the side S2 where the first light emitting unit LED-1 and the second light emitting unit LED-2 are adjacent, wherein the side S3 and the side S4 are adjacent sides connected to the side S1 and the side S2.

As shown in FIGS. 10A to 10B, the shielding sheet SS may include a masking portion MP and a light transmitting portion TP. The masking portion MP and the light transmitting portion TP may be stacked in various configurations to form the shielding sheet SS. The masking portion MP is opaque, while the light transmitting portion TP may have both reflective and translucent characteristics. In other words, the light transmitting portion TP may reflect part of the light and allow part of the light to pass through. For example, the masking portion MP may be black ink, and the light transmitting portion TP may be white ink, but not limited thereto. In this embodiment, the masking portion MP includes an outer frame portion MP-1. The outer frame portion MP-1 surrounds the light transmitting portion TP. The masking portion MP overlaps in projection with the first light emitting unit LED-1. Specifically, in the stacking (vertical) direction, the first light emitting unit LED-1 overlaps in projection with the outer frame portion MP-1. The masking portion MP functions as a means for adjusting the light output from the first light emitting unit LED-1 toward the specific function key KS-1. The light guide panel slot LS is shielded by the masking portion MP. That is, the light guide panel slot LS overlaps in projection with the masking portion MP. Specifically, the light guide panel slot LS overlaps in projection with the outer frame portion MP-1. The light guide panel slot LS surrounds the light transmitting portion TP, and does not overlap in projection with the light transmitting portion TP. The second light emitting unit LED-2 overlaps in projection with the light transmitting portion TP. That is, in a top view along the stacking (vertical) direction, the second light emitting unit LED-2 is located within a range of the light transmitting portion TP. Also, in a top view along the stacking (vertical) direction, the second light emitting unit LED-2 partially overlaps in projection with the masking portion MP.

Furthermore, as shown in FIGS. 10A to 10B, the backlight module BLM may further include a reflective layer REF. The reflective layer REF may be disposed between the light guide panel LGP and the lighting board LCB. The reflective layer REF may include a first reflective layer hole RH-1 corresponding to the first light emitting unit LED-1. The first light emitting unit LED-1 may be disposed in the first reflective layer hole RH-1. The first light guide hole L0-1 and the first reflective layer hole RH-1 are vertically aligned. Thus, the first light emitting unit LED-1 may pass through both the first light guide hole L0-1 and the first reflective layer hole RH-1. The reflective layer REF may further include an attachment portion RA. The attachment portion RA corresponds in shape to the light guide panel slot LS and is also in an inverted U-shape. The reflective layer REF may bond upward to the lower surface of the shielding sheet SS by its attachment portion RA passing through the light guide panel slot LS, so as to wrap around the edge of the light guide panel slot LS of the light guide panel LGP, thereby achieving a light-leakage prevention effect. Specifically, the attachment portion RA may be provided with an adhesive for bonding the shielding sheet SS. Before bonding the reflective layer REF and the shielding sheet SS, embossing or stamping may be used to give the attachment portion RA or the shielding sheet SS a preset shape to improve bonding efficiency. For example, the attachment portion RA may be black ink, and the other portions of the reflective layer REF may be white ink, but it is not limited thereto.

The layout of each embodiment related to the specific function key KS-1 within the light emitting keyboard LKB is described below. As shown in FIGS. 7B, 8B, 9B, and 10B, the specific function key KS-1 and its two adjacent keys can be aligned with three keys located in an adjacent row. The three keys located in the adjacent row relative to the specific function key KS-1 may adopt the design of the heat-dissipating key KS as described previously. Furthermore, the three keys in the adjacent row relative to the specific function key KS-1 may, for example, correspond to the heat-dissipating keys KS located in the middle row ROW2 of the special layout illustrated in FIG. 5. In other words, since the specific function key KS-1 is aligned with the three keys located in the adjacent row, and since these three keys may be heat-dissipating keys KS positioned in the middle row ROW2, it can be understood that the specific function key KS-1 may be offset from the heat-dissipating key KS located in the top row ROW1 (as shown in FIG. 5) by ½ of the key center. Accordingly, in the embodiments shown in FIGS. 7A-7B and 9A-9B, the first light emitting unit LED-1 and the second light emitting unit LED-2 may be disposed between the left penetration channel PC-L and the right penetration channel PC-R of a heat-dissipating key KS located in the middle row ROW2. Additionally, in the embodiments shown in FIGS. 7A-7B and 9A-9B, the first light emitting unit LED-1 and the second light emitting unit LED-2 may be disposed between the right penetration channel PC-R of a heat-dissipating key KS located in the top row ROW1 and the left penetration channel PC-L of another adjacent heat-dissipating key KS also located in the top row ROW1. Furthermore, in the embodiments shown in FIGS. 8A-8B and 10A-10B, the first light emitting unit LED-1 and the second light emitting unit LED-2 may be disposed such that, in the X direction (as shown in FIG. 5), they at least partially overlap the region between the left penetration channel PC-L and the right penetration channel PC-R of a heat-dissipating key KS located in the middle row ROW2. Additionally, in the embodiments shown in FIGS. 8A-8B and 10A-10B, the first light emitting unit LED-1 and the second light emitting unit LED-2 may be disposed such that, in the X direction (as shown in FIG. 5), they respectively at least partially overlap the right penetration channel PC-R of a heat-dissipating key KS located in the top row ROW1 and the left penetration channel PC-L of another adjacent heat-dissipating key KS also located in the top row ROW1.

Figure 11A:
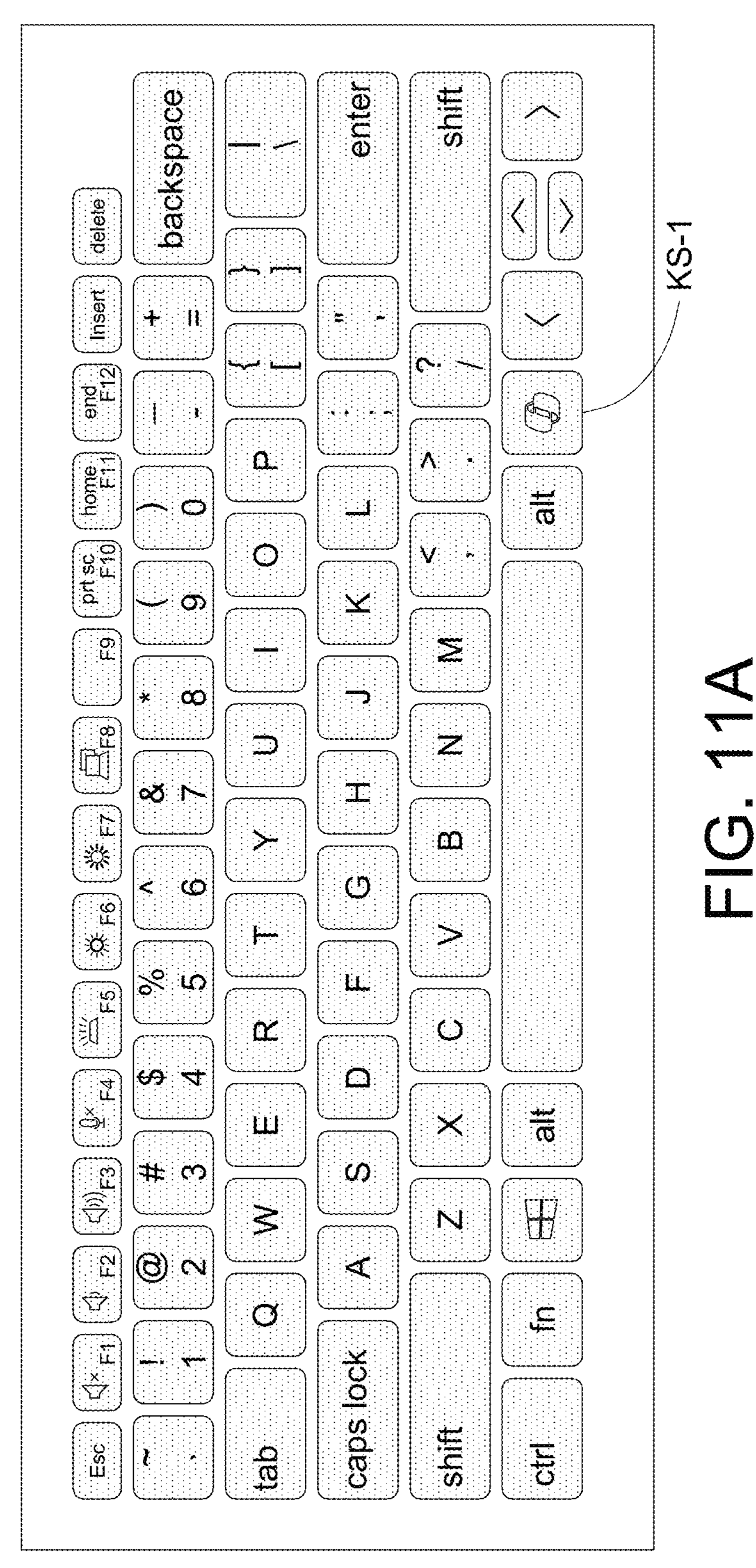
FIGS. 11A to 11C are schematic diagrams illustrating embodiments of the specific function key in response to the operation mechanism of a computing device.
Figure 11B:
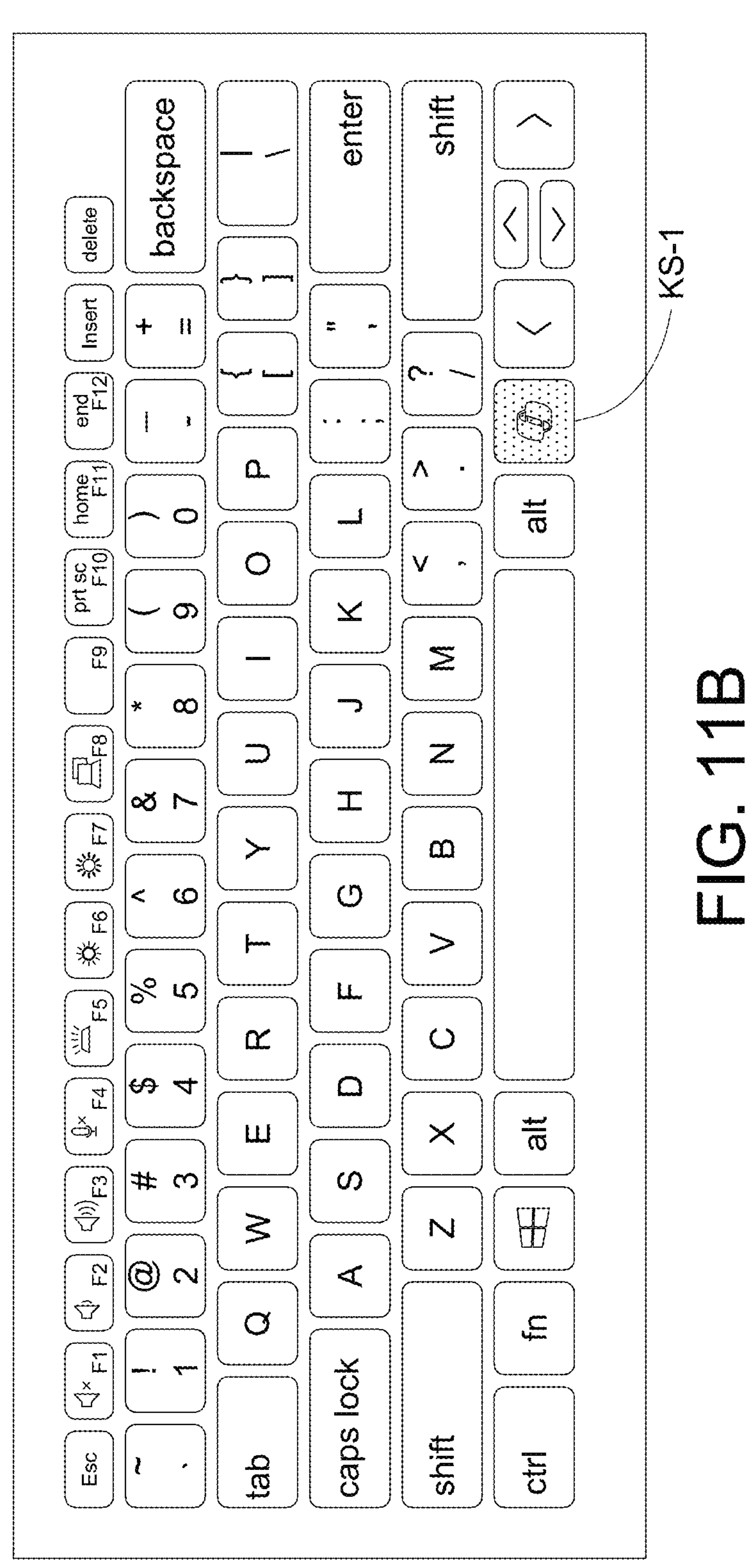
Figure 11C:

Then, the operation mechanism of the above-described embodiments of the specific function key KS-1 in response to the operation of a computing device will be explained. Referring to FIGS. 11A to 11C. FIG. 11A is a schematic diagram illustrating a first state of the lighting keyboard LKB in response to the operation mechanism of the computing device. FIG. 11B is a schematic diagram illustrating a second state of the lighting keyboard LKB in response to the operation mechanism of the computing device. FIG. 11C is a schematic diagram illustrating a third state of the lighting keyboard LKB in response to the operation mechanism of the computing device.

As shown in FIG. 11A, in the first state, when the specific function (e.g., AI-assisted function) of the computing device is not activated, a computing unit of the computing device can control the first light emitting unit LED-1 in the lighting keyboard LKB to emit light and control the second light emitting unit LED-2 below the specific function key KS-1 not to emit light. In the figures, halftone dots indicate illumination. At this time, in the first state, the lighting keyboard LKB provides a function of general backlighting. The computing unit of the computing device in the first state operates at a first performance level, a memory of the computing device operates at a first usage level, and a fan of the computing device operates at a first rotational speed or may not operate.

As shown in FIG. 11B, in the second state, when the specific function such as the AI-assisted function of the computing device is activated (i.e., the specific function key KS-1 is pressed), the computing unit of the computing device can control the second light emitting unit LED-2 under the specific function key KS-1 to emit light and control the first light emitting unit LED-1 in the lighting keyboard LKB not to emit light. In the figures, halftone dots indicate illumination. At this time, in the second state, the lighting keyboard LKB provides a function of dedicated backlighting for the specific function key KS-1. The computing unit of the computing device operates at a second performance level higher than the first performance level, the memory of the computing device operates at a second usage level higher than the first usage level, and the fan of the computing device operates at a second rotational speed higher than the first rotational speed.

As shown in FIG. 11C, in the third state, likewise when the specific function such as the AI-assisted function of the computing device is activated (i.e., the specific function key KS-1 is pressed), the computing unit of the computing device can control both the second light emitting unit LED-2 under the specific function key KS-1 and the first light emitting unit LED-1 in the lighting keyboard LKB to emit light. In the figures, halftone dots indicate illumination. At this time, in the third state, the lighting keyboard LKB provides both the function of general backlighting and the function of dedicated backlighting for the specific function key KS-1. The computing unit of the computing device operates at a third performance level higher than the second performance level, the memory of the computing device operates at a third usage level higher than the second usage level, and the fan of the computing device operates at a third rotational speed higher than the second rotational speed.

Figure 12:
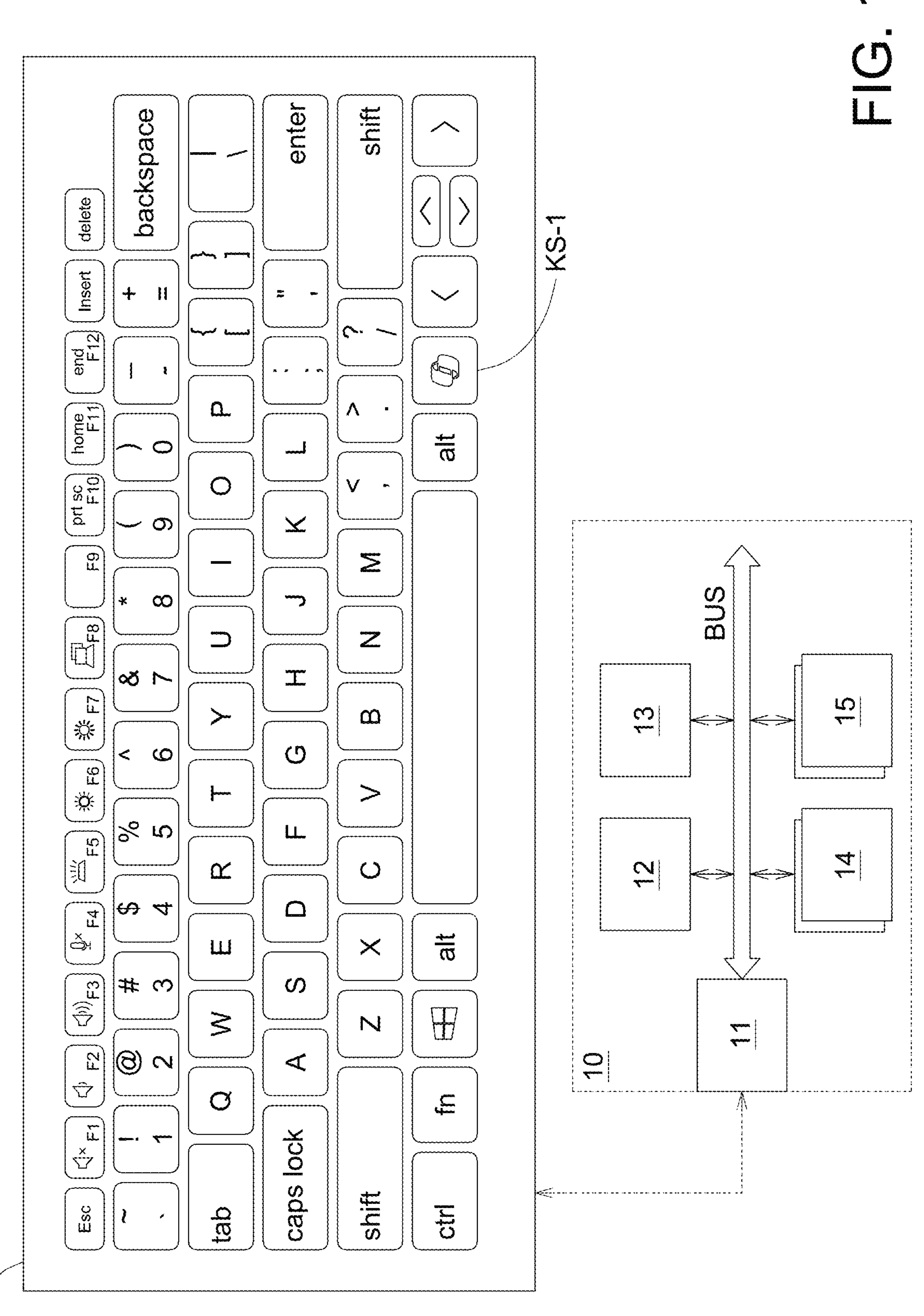
FIG. 12 is a system block diagram illustrating the connection architecture between the lighting keyboard, its specific function key, and the computing device.

Referring to FIG. 12, FIG. 12 is a system block diagram illustrating the connection architecture of between the lighting keyboard LKB, its specific function key KS-1, and a computing device.

As shown in FIG. 12, a computing device 10 may include an interface processor 11, storage media 12, fan 13, memory 14, and a computing unit 15, wherein the interface processor 11, the storage media 12, the fan 13, the memory 14 and the computing unit 15 can be connected via a bus. The lighting keyboard LKB can be connected to the computing device 10 via the interface processor 11. When the specific function key KS-1 of the lighting keyboard LKB is pressed, the AI-assisted function of the computing device 10 can be activated accordingly, thereby enhancing the computing performance. When the computing performance of the computing device 10 is enhanced, the performance of the computing unit 15, the usage of the memory 14, and the speed of the fan 13 are all increased. When the computing device 10 is externally connected to a graphics processing unit (GPU) or a network communication unit, or performs cloud computing, such configurations can also be regarded as computing units that further enhance the computing performance of the computing device 10. Software for AI-accelerated computing can be installed and operated on the computing device 10 or in the cloud.

As mentioned in the above, the present invention provides a backlight module for a specific function key on a lighting keyboard. As such, when a specific function of a computing device is activated, a light color can be displayed beneath the specific function key, allowing the user to easily recognize that the specific function is in an active state. Thus, the present invention provides a configuration of an embedded keyboard module in response to the specific function of the computing device.

In another aspect, when the backlight module of the lighting keyboard or a heating element disposed below the lighting keyboard generates a relatively high amount of heat, a surface temperature of the lighting keyboard may rise, thereby affecting user experience. In view of this, the technical features of the embodiments described hereinafter focus on further enhancing the heat dissipation performance of the lighting keyboard.

Figure 13:
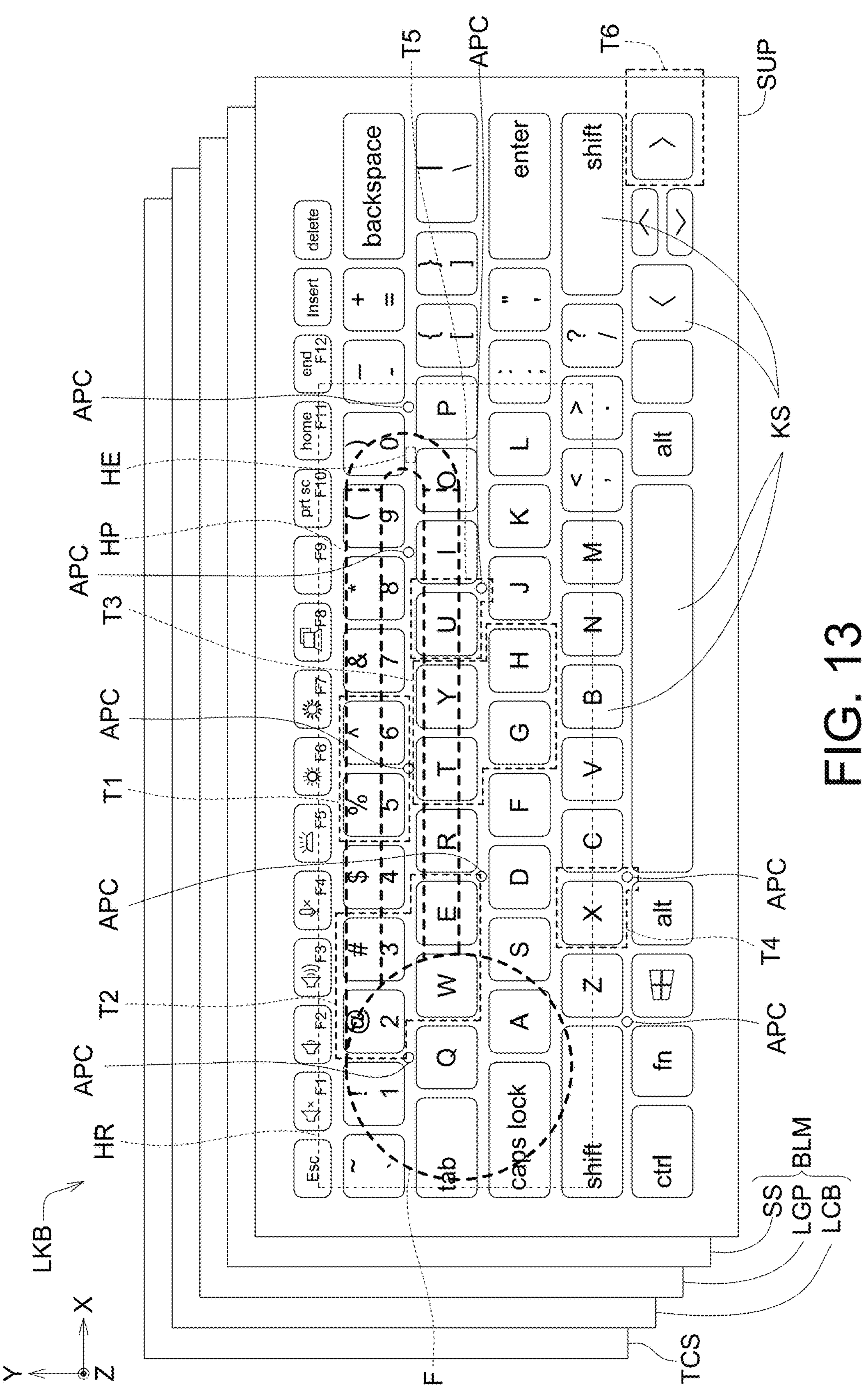
FIG. 13 is a schematic view illustrating a lighting keyboard according to an embodiment of the invention.

Referring to FIG. 13, FIG. 13 is a schematic diagram of a lighting keyboard LKB according to another embodiment of the present invention.

In this embodiment, a lighting keyboard LKB is additionally provided with a thermally conductive sheet TCS, and the thermally conductive sheet TCS is disposed below a backlight module BLM. The thermally conductive sheet TCS serves to laterally diffuse heat generated by the lighting keyboard LKB and to conduct the heat to other regions, thereby reducing the surface temperature of the lighting keyboard. In this embodiment, the lighting keyboard LKB includes an additional penetration channel APC. The additional penetration channel APC is located in a gap (corresponding to the aforementioned gap region G) between heat-dissipating keys KS. In contrast to the penetration channel PC, in the embodiments of FIGS. 1 to 6, being located within the keycap projection area of the heat-dissipating key KS, the additional penetration channel APC is disposed outside the keycap projection area of the heat-dissipating key KS.

Figure 14:
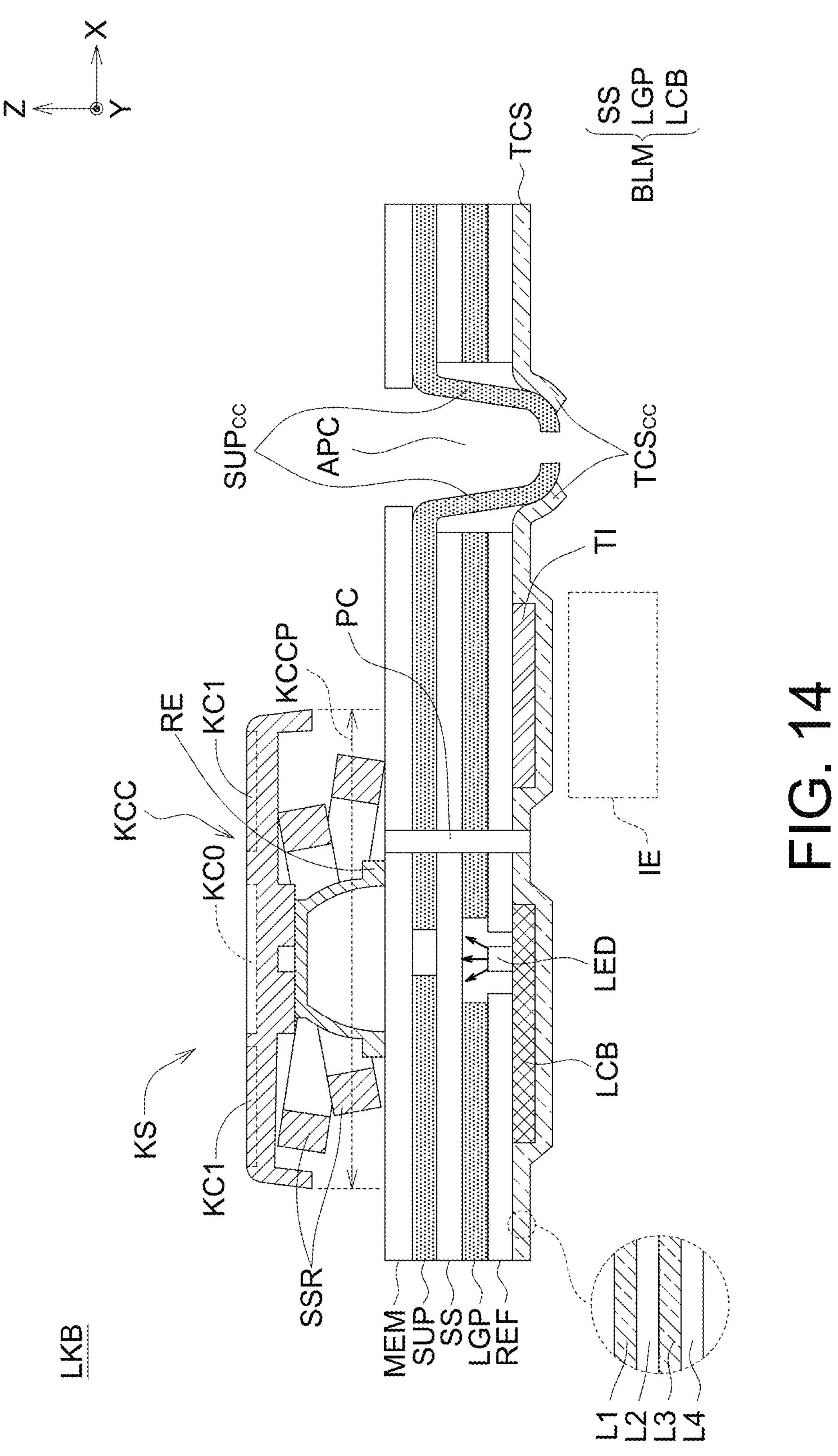
FIG. 14 is a partial sectional view illustrating the lighting keyboard shown in FIG. 13.

Please further refer to FIG. 14, which is a sectional view illustrating a partial region T4 of the lighting keyboard LKB shown in FIG. 13.

As shown in FIG. 14, the thermally conductive sheet TCS is located below the backlight module BLM and covers the lighting board LCB. The thermally conductive sheet TCS may be formed by stacking layer structures L1 to L4. For example, the layer structure L1 is acrylic; the layer structure L2 is copper foil; the layer structure L3 is graphite; and the layer structure L4 is polyethylene terephthalate (PET). That is, the thermally conductive sheet TCS is a multilayer composite material formed by stacking acrylic, copper foil, graphite, and polyethylene terephthalate, and serves as a graphite-copper foil heat-dissipating film. The penetration channel PC is located within the keycap projection area KCCP of the heat-dissipating key KS, and penetrates not only a key circuit board MEM and a support plate SUP, but also a shielding sheet SS, a light guide panel LGP, and a lighting board LCB (and its reflective layer REF) of the backlight module BLM, as well as the thermally conductive sheet TCS. Accordingly, the penetration channel PC is configured to be heat-dissipating channel for the heat region HR located beneath the thermally conductive sheet TCS. The additional penetration channel APC is located outside the keycap projection area KCCP of the heat-dissipating key KS and penetrates the key circuit board MEM, the support plate SUP and the thermally conductive sheet TCS. Specifically, the support plate SUP includes a support plate concave portion $SUP_{CC}$, and the thermally conductive sheet TCS includes a thermally conductive sheet concave portion $TCS_{CC}$. Both the support plate concave portion $SUP_{CC}$ and the thermally conductive sheet concave portion $TCS_{CC}$ are located outside the keycap projection area KCCP and protrude in a direction away from the heat-dissipating key KS (−Z-axis direction). The additional penetration channel APC penetrates through the support plate concave portion $SUP_{CC}$ and the thermally conductive sheet concave portion $TCS_{CC}$. That is, both the support plate concave portion $SUP_{CC}$ and the thermally conductive sheet concave portion $TCS_{CC}$ are formed with openings/holes. The additional penetration channel APC may serve as heat-dissipating channel and may also allow a boss (not illustrated) to pass therethrough for fixing, wherein the hole walls of the key circuit board MEM, the support plate concave portion $SUP_{CC}$ and the thermally conductive sheet concave portion $TCS_{CC}$ are in direct contact with the boss. As shown in FIG. 14, the support plate concave portion $SUP_{CC}$ covers the shielding sheet SS and the light guide panel LGP, while the thermally conductive sheet concave portion $TCS_{CC}$ is in contact with (e.g., via adhesive bonding or direct contact) the support plate concave portion $SUP_{CC}$. This design helps prevent light emitted from the light-emitting unit LED from leaking through the additional penetration channel APC.

Furthermore, the lighting keyboard LKB may further include a thermal insulator TI. As shown in FIG. 14, the thermal insulator TI is disposed, in the longitudinal direction (parallel to the Z-axis), between the reflective layer REF and the thermally conductive sheet TCS. The thermally conductive sheet TCS covers the thermal insulator TI from below, and the thermal insulator TI partially overlaps the keycap projection area KCCP. In the lateral direction (parallel to the X-axis), the thermal insulator TI is disposed between the penetration channel PC and the additional penetration channel APC, and neither the penetration channel PC nor the additional penetration channel APC penetrates the thermal insulator TI. The longitudinal position (parallel to the Z-axis) of the thermal insulator TI corresponds to that of an internal element IE disposed below, wherein the internal element IE may, for example, be a computing chip, a display chip, or a heat sink of a notebook computer incorporating the lighting keyboard LKB. By providing the thermal insulator TI, the thickness above the internal element IE is increased, thereby preventing direct heat transfer from the internal element IE to the backlight module BLM. For example, the thermal insulator TI is a composite material including nanoscale porous silica and carbon, and has a characteristic of low thermal conductivity (with a thermal conductivity coefficient, for example, of 0.009 W/m·K).

Figure 15A:
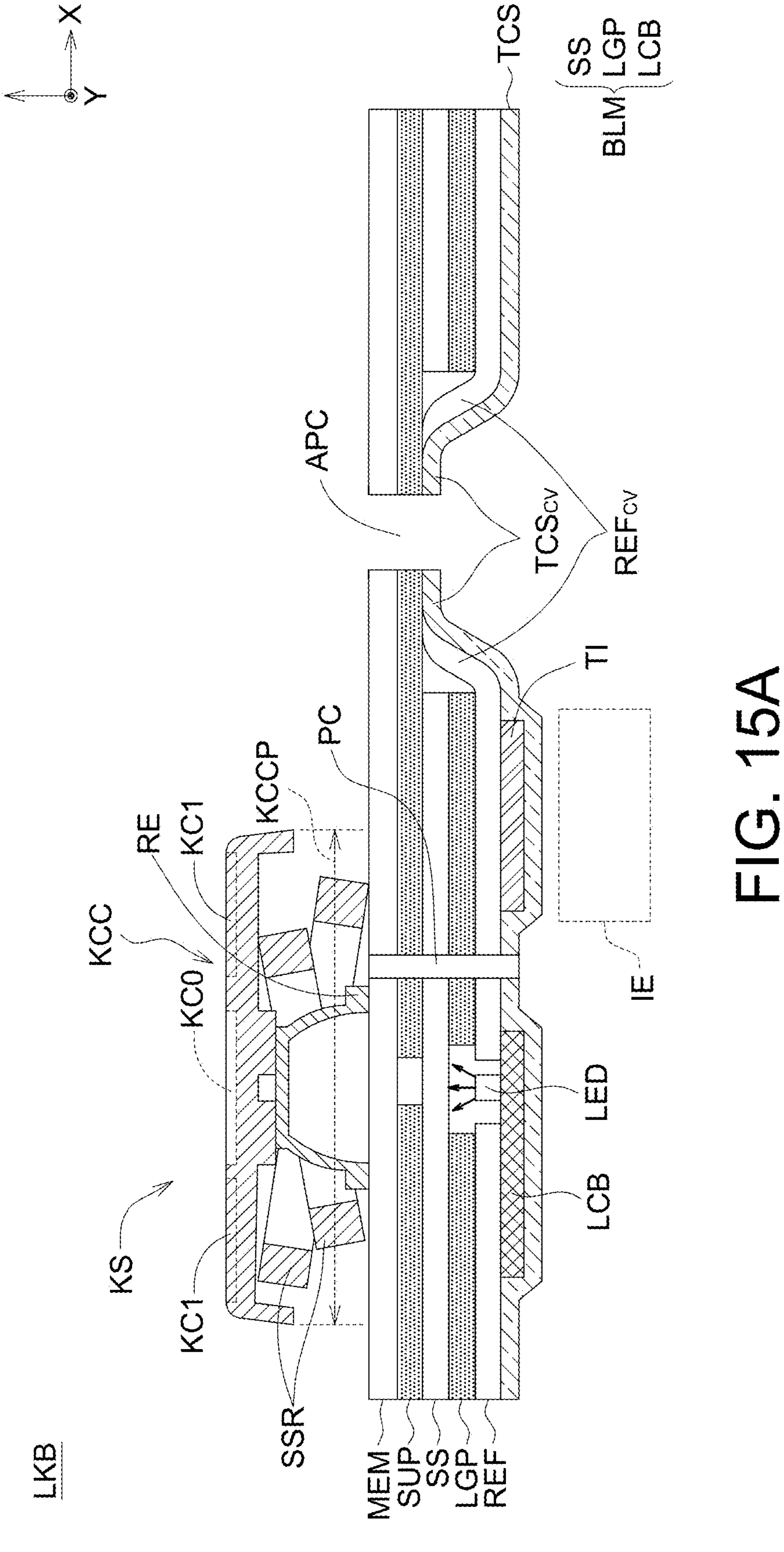
FIG. 15A is a partial sectional view illustrating the lighting keyboard shown in FIG. 13.

Referring to FIG. 15A, FIG. 15A is a sectional view of a partial region T5 of the lighting keyboard LKB shown in FIG. 13. The sectional structure of the lighting keyboard LKB depicted in FIG. 15A differs from that shown in FIG. 14 in terms of the structural configuration of the additional penetration channel APC, as will be described below. Other similar descriptions may be referred to in the explanation of FIG. 14 and will not be repeated herein.

The additional penetration channel APC of the partial region T5 is located outside the keycap projection area KCCP of the heat-dissipating key KS, and penetrates the key circuit board MEM, the support plate SUP, and the thermally conductive sheet TCS. Specifically, the thermally conductive sheet TCS includes a thermally conductive sheet convex portion $TCS_{CV}$, and the reflective layer REF includes a reflective layer convex portion $REF_{CV}$. Both the thermally conductive sheet convex portion $TCS_{CV}$ and the reflective layer convex portion $REF_{CV}$ are located outside the keycap projection area KCCP and protrude in the direction toward the heat-dissipating key KS (+Z-axis direction). The thermally conductive sheet convex portion $TCS_{CV}$ is in contact with (e.g., via adhesive bonding or direct contact) the reflective layer convex portion $REF_{CV}$ and the support plate SUP. The additional penetration channel APC penetrates through the thermally conductive sheet convex portion $TCS_{CV}$, That is, the thermally conductive sheet convex portion $TCS_{CV}$ includes an opening/hole. As shown in FIG. 15A, the hole wall of the thermally conductive sheet convex portion $TCS_{CV}$ corresponding to the additional penetration channel APC can be aligned with the hole walls of the key circuit board MEM and the support plate SUP corresponding to the same. The additional penetration channel APC of the partial region T5 may serve as a heat-dissipating channel and may also allow a boss (not illustrated) to pass therethrough for fixing, wherein the hole walls of the key circuit board MEM, the support plate SUP, and the thermally conductive sheet convex portion $TCS_{CV}$ are in direct contact with the boss.

As shown in FIG. 15A, the reflective layer convex portion $REF_{CV}$ covers the shielding sheet SS and the light guide panel LGP, and the reflective layer convex portion $REF_{CV}$ is in contact with (e.g., via adhesive bonding or direct contact) the support plate SUP. In this way, the reflective layer convex portion $REF_{CV}$ can reflect the light propagating within the light guide panel LGP to prevent light emitted from the light-emitting unit LED from leaking through the additional penetration channel APC. However, the invention is not limited thereto. In another embodiment, the reflective layer REF may be configured without the bent reflective layer convex portion $REF_{CV}$. Instead, the shielding sheet SS and the light guide panel LGP are covered by the thermally conductive sheet convex portion $TCS_{CV}$, which can reflect the light propagating in the light guide panel LGP to prevent light emitted from the light-emitting unit LED from leaking through the additional penetration channel APC.

Figure 15B:
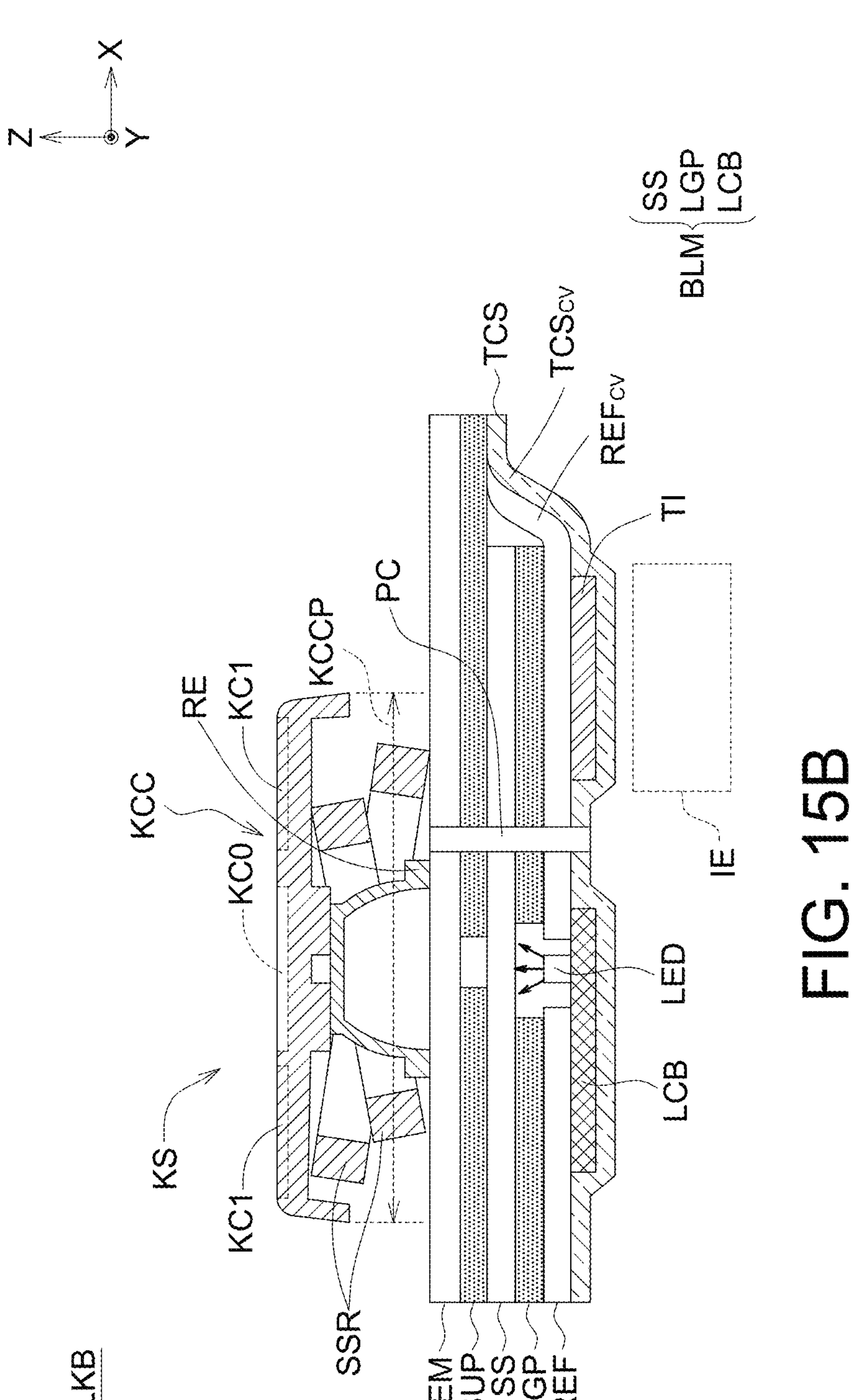
FIG. 15B is a partial sectional view illustrating the lighting keyboard shown in FIG. 13.

Referring to FIG. 15B, which is a sectional view of a partial region T6 of the lighting keyboard LKB shown in FIG. 13. The sectional structure of the lighting keyboard LKB depicted in FIG. 15B differs from that shown in FIG. 15A in the positioning of the reflective layer convex portion $REF_{CV}$ and the thermally conductive sheet convex portion $TCS_{CV}$, as will be described below. Other similar descriptions may be referred to in the explanation of FIGS. 14 and 15A and will not be repeated herein.

The partial region T6 corresponds to a lateral edge of the lighting keyboard LKB, where the aforementioned additional penetration channel APC is not present. The thermally conductive sheet TCS includes a thermally conductive sheet convex portion $TCS_{CV}$, and the reflective layer REF includes a reflective layer convex portion $REF_{CV}$. Both the thermally conductive sheet convex portion $TCS_{CV}$ and the reflective layer convex portion $REF_{CV}$ are located outside the keycap projection area KCCP and protrude in the direction toward the heat-dissipating key KS (+Z-axis direction). The thermally conductive sheet convex portion $TCS_{CV}$ is in contact with (e.g., via adhesive bonding or direct contact) the reflective layer convex portion $REF_{CV}$ and the support plate SUP, such that the thermally conductive sheet convex portion $TCS_{CV}$ encloses the edge of the backlight module BLM and the support plate SUP. As shown in FIG. 15B, the reflective layer convex portion $REF_{CV}$ covers the shielding sheet SS and the light guide panel LGP, and is in contact with (e.g., via adhesive bonding or direct contact) the support plate SUP. This design allows the reflective layer convex portion $REF_{CV}$ to reflect the light propagating within the light guide panel LGP and thereby prevent light emitted from the light-emitting unit LED from leaking out from the side of the lighting keyboard LKB. However, the invention is not limited thereto. In another embodiment, the reflective layer REF may be configured without the bent reflective layer convex portion $REF_{CV}$. Instead, the shielding sheet SS and the light guide panel LGP are covered by the thermally conductive sheet convex portion $TCS_{CV}$, which can reflect the light propagating in the light guide panel LGP to prevent light emitted from the light-emitting unit LED from leaking from the side of the lighting keyboard LKB. As shown in FIG. 15B, a sidewall of the thermally conductive sheet convex portion $TCS_{CV}$ corresponding to the lateral edge of the lighting keyboard LKB can be aligned with sidewalls of the key circuit board MEM and the support plate SUP that correspond to the lateral edge of the lighting keyboard LKB.

As mentioned in the above, the present invention further provides the configuration of a thermally conductive sheet, a thermal insulator, and/or an additional penetration channel in the lighting keyboard. Accordingly, in addition to dissipating heat through the penetration channel within the keycap projection area, heat dissipation can also be achieved via the thermally conductive sheet, the thermal insulator, and the additional penetration channel outside the keycap projection area. This design further enhances the heat dissipation performance of the lighting keyboard, thereby reducing the surface temperature of the lighting keyboard and optimizing user experience.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A backlight module for a lighting keyboard, wherein the lighting keyboard has a specific function key, and the backlight module comprises:

a lighting board having a first light emitting unit and a second light emitting unit;

a light guide panel having a first light guide hole and a second light guide hole, wherein the first light emitting unit is in the first light guide hole, and the second light emitting unit is in the second light guide hole;

a shielding sheet having a blocking portion, wherein the shielding sheet, the light guide panel and the lighting board are stacked from top to bottom, and the blocking portion overlaps in projection with the first light emitting unit and the second light emitting unit; and a reflective layer disposed between the light guide panel and the lighting board, and having a first reflective layer hole, a second reflective layer hole and an attachment portion;

wherein, the light guide panel has a light guide panel slot, and the light guide panel slot overlaps in projection with the blocking portion and a boundary of a keycap projection area of the specific function key;

wherein, the first light guide hole is vertically aligned with the first reflective layer hole, the second light guide hole is vertically aligned with the second reflective layer hole, the light guide panel slot is vertically aligned with the attachment portion, the first light emitting unit is located in the first reflective layer hole, the second light emitting unit is located in the second reflective layer hole, and the attachment portion overlaps in projection with the blocking portion and the boundary of the keycap projection area.

2. The backlight module for the lighting keyboard according to claim 1, wherein the first light emitting unit and the second light emitting unit are respectively adjacent to two opposite sides of the keycap projection area.

3. The backlight module for the lighting keyboard according to claim 2, wherein the light guide panel slot overlaps in projection with one of two opposite sides and an additional two opposite sides of the keycap projection area, and the additional pair of opposite sides is connected to the one of the two opposite sides.

4. The backlight module for the lighting keyboard according to claim 1, wherein the shielding sheet has a light transmitting portion, the blocking portion includes an outer frame portion and an inner block portion, the outer frame portion surrounds the light transmitting portion, and the inner block portion is located within a range of the light transmitting portion.

5. The backlight module for the lighting keyboard according to claim 4, wherein the first light emitting unit overlaps in projection with the outer frame portion, and the second light emitting unit overlaps in projection with the projection of the inner block portion.

6. The backlight module for the lighting keyboard according to claim 4, wherein the light guide panel slot overlaps in projection with the outer frame portion, and the light guide panel slot does not overlap in projection with the inner block portion.

7. The backlight module for the lighting keyboard according to claim 1, wherein the first light emitting unit and the second light emitting unit are adjacent to a side of the keycap projection area.

8. The backlight module for the lighting keyboard according to claim 7, wherein the light guide panel slot does not overlap in projection with the side of the keycap projection area.

9. The backlight module for the lighting keyboard according to claim 7, wherein the shielding sheet has a light transmitting portion, the blocking portion includes an outer frame portion, the outer frame portion surrounds the light transmitting portion, and the inner block portion is located within a range of the light transmitting portion.

10. The backlight module for the lighting keyboard according to claim 9, wherein the light guide panel slot overlaps in projection with the outer frame.

11. The backlight module for the lighting keyboard according to claim 9, wherein a light color of the first light emitting unit is different from a light color of the second light emitting unit.

12. A lighting keyboard, comprising:

a backlight module including:

a lighting board having a first light emitting unit;

a light guide panel having a first light guide hole, wherein the first light emitting unit is in the first light guide hole; and a shielding sheet has a blocking portion, wherein the shielding sheet, the light guide panel and the lighting board are stacked from top to bottom, and the blocking portion overlaps in projection with the first light emitting unit;

a specific function key located above the backlight module and including a key circuit board, wherein the key circuit board has a second light emitting unit;

wherein, the light guide panel has a light guide panel slot, and the light guide panel slot overlaps in projection with the blocking portion and a boundary of a keycap projection area of the specific function key.

13. The lighting keyboard according to claim 12, wherein further comprising:

a reflective layer disposed between the light guide panel and the lighting board, and having a first reflective layer hole and an attachment portion;

wherein, the first light guide hole is vertically aligned with the first reflective layer hole, the light guide panel slot is vertically aligned with the attachment portion, the first light emitting unit is located in the first reflective layer hole, and the attachment portion overlaps in projection with the blocking portion and the boundary of the keycap projection area.

14. The lighting keyboard according to claim 12, wherein the first light emitting unit and the second light emitting unit are respectively adjacent to two opposite sides of the keycap projection area.

15. The lighting keyboard according to claim 14, wherein the shielding sheet has a light transmitting portion, the blocking portion includes an outer frame portion, the outer frame portion surrounds the light transmitting portion, the outer frame portion overlaps in projection with the first light emitting unit, and the light transmitting portion overlaps in projection with the second light emitting unit.

16. The lighting keyboard according to claim 14, wherein the light guide panel slot overlaps in projection with one of two opposite sides and an additional two opposite sides of the keycap projection area, and the additional pair of opposite sides is connected to the one of the two opposite sides.

17. The lighting keyboard according to claim 12, wherein the first light emitting unit and the second light emitting unit are adjacent to a side of the keycap projection area.

18. The lighting keyboard according to claim 17, wherein the shielding sheet has a light transmitting portion, the blocking portion includes an outer frame portion, the outer frame portion surrounds the light transmitting portion, the outer frame portion overlaps in projection with the first light emitting unit and the second light emitting unit.

19. The lighting keyboard according to claim 18, wherein the light guide panel slot does not overlap in projection with the side of the keycap projection area.

* * * * *